United States Patent
Partridge

(10) Patent No.: US 7,646,180 B2
(45) Date of Patent: Jan. 12, 2010

(54) POWER LOSSES REDUCTION IN SWITCHING POWER CONVERTERS

(75) Inventor: Donald F. Partridge, Los Gatos, CA (US)

(73) Assignee: One More Time LLC, Los Gatos, CA (US)

( * ) Notice: Subject to any disclaimer, the term of this patent is extended or adjusted under 35 U.S.C. 154(b) by 0 days.

(21) Appl. No.: 12/175,331

(22) Filed: Jul. 17, 2008

(65) Prior Publication Data

US 2008/0297123 A1    Dec. 4, 2008

Related U.S. Application Data

(63) Continuation of application No. 11/369,445, filed on Mar. 6, 2006, now Pat. No. 7,417,409.

(60) Provisional application No. 60/659,599, filed on Mar. 7, 2005.

(51) Int. Cl.
*G05F 1/10*   (2006.01)
(52) U.S. Cl. ..................... 323/222
(58) Field of Classification Search ............ 323/222, 323/223, 225, 233; 363/50, 55, 56.12
See application file for complete search history.

(56) References Cited

U.S. PATENT DOCUMENTS

| | | | |
|---|---|---|---|
| 3,652,874 | A | 3/1972 | Partridge |
| 5,399,908 | A | 3/1995 | Donaldson |
| 5,448,465 | A | 9/1995 | Yoshida et al. |
| 5,570,276 | A | 10/1996 | Cuk et al. |
| 6,051,893 | A | 4/2000 | Yamamotoa et al. |
| 6,625,046 | B2 * | 9/2003 | Geissler .................. 363/89 |
| 6,757,184 | B2 | 6/2004 | Wei et al. |
| 6,847,196 | B2 * | 1/2005 | Garabandic ............... 323/222 |

(Continued)

FOREIGN PATENT DOCUMENTS

GB    2324661 A    10/1998

(Continued)

OTHER PUBLICATIONS

J. Holtz, et al., "High-power pulsewidth controlled current source GTO inverter for high switching frequency," Industry Applications Conference, 1997, vol. 2, pp. 1330-1335 (Oct. 5, 1997).

(Continued)

*Primary Examiner*—Matthew V Nguyen
(74) *Attorney, Agent, or Firm*—Blakely, Sokoloff, Taylor & Zafman LLP

(57) ABSTRACT

Embodiments of the invention provide methods and apparatuses for concurrently eliminating or substantially reducing two or more switching losses in an inverter switching circuit. Embodiments of the invention concurrently reduce multiple types of switching losses under hard switching mode and soft switching mode for active switching devices and diodes. In one embodiment of the invention, the voltage across a switching device is substantially reduced during switch turn-off and/or turn-on time, and also maintained at a substantially reduced level throughout some or all of the tail current loss time of the switching device. The voltage reduction mechanism is implemented as a transformer circuit electrically serially implemented between the voltage source and the switching device. Other methods and apparatuses are also described.

11 Claims, 27 Drawing Sheets

U.S. PATENT DOCUMENTS

| | | | |
|---|---|---|---|
| 7,002,323 B2 * | 2/2006 | Natori | 323/225 |
| 7,113,575 B2 | 9/2006 | Orr | |
| 7,148,662 B2 | 12/2006 | Kato | |

FOREIGN PATENT DOCUMENTS

| | | | |
|---|---|---|---|
| WO | WO 01/73948 A | 10/2001 | |

OTHER PUBLICATIONS

PCT Notification of Transmittal of The International Search Report and the Written Opinion of the International Searching Authority or The Declaration for PCT Counterpart Application No. PCT/US2006/008292 Containing International Search Report (Oct. 31, 2006).

PCT Notification of Transmittal of International Preliminary Examination Report on Patentability for PCT Counterpart Application No. PCT/US06/08292, 4 pgs. (Feb. 27, 2008).

\* cited by examiner $$N = \frac{1.8CEf_0 + t_1I_0f_0 - I_0}{0.9t_1I_0f_0 + 0.81CEI_0f_0} \pm \frac{\sqrt{\left(\frac{1.8CEf_0 + t_1I_0f_0 - I_0}{1.8t_1I_0f_0 + 1.62CEI_0f_0}\right)^2 - \frac{CE}{0.9t_1I_0 + 0.81CEI_0}}}{}$$

FIG. 8H

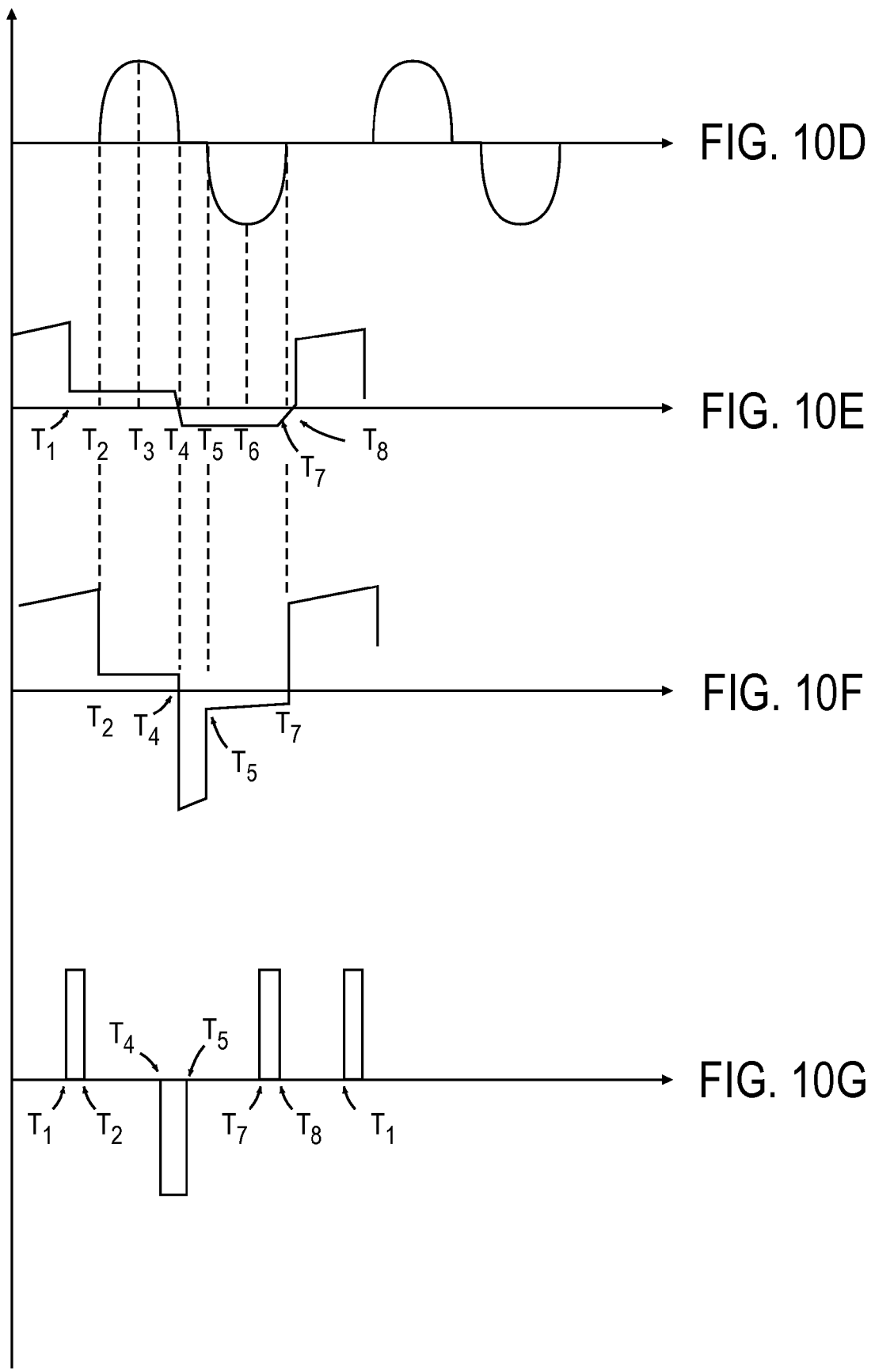

POWER LOSSES REDUCTION IN SWITCHING POWER CONVERTERS

RELATED APPLICATIONS

This application is a continuation of U.S. patent application Ser. No. 11/369,445, filed Mar. 6, 2006 (which issued as U.S. Pat. No. 7,417,409 B2 on Aug. 26, 2008), which claims the benefit of U.S. Provisional Application No. 60/659,599, filed Mar. 7, 2005. The disclosure of which is incorporated by reference herein in its entirety.

FIELD OF THE INVENTION

The present invention relates generally to power converters. More particularly, this invention relates to power losses reduction in switching power converters.

BACKGROUND

Power converters are employed in electronic equipment to control power delivered to a variety of loads. Power input is typically 50 or 60 Hz at standard voltages such as 110V, 220V, 440V, 2.4 kV, 3.3 kV, etc. Power converters are used to rectify the input voltage into a DC level; an inverter is then used to invert the DC voltage to an AC voltage. Industrial uses involving varying the frequency and the voltage magnitude.

Circuits used to invert the DC voltage employ switching devices which are turned on and off with a prescribed modulation pattern. This provides an output signal having a desired frequency and magnitude. For example, a typical modulation pattern that may be employed is pulse width modulation (PWM). PWM alters the width of the conduction waveform of the switching devices so that, after filtering, output voltage varies from a positive peak voltage through 0 volts to a negative peak voltage thereby producing an alternating voltage output.

Typical switching circuits employed in an inverter circuit include bi-polar transistors, insulated gate bi-polar transistors (IGBTs), gate turn-off thyristors (GTOs), silicon-controlled rectifier devices (SCR's) and integrated gate commutated thyristors (IGCTs), among others. Such switching circuits incur several types of losses including switching device losses and freewheeling diode losses (for inductive inverter circuits).

Switching Device Losses

Switching device losses include two main sources, switching loss and conduction loss. Conduction losses are the normal losses of the switching device while conducting current when running in a saturated condition. Switching losses are the losses associated with the actions of turning active switching devices on and off. Switching losses occur when there is simultaneously, high voltage across the device and current through it during transitions between on and off. Typically a power converter uses PWM with the switching device used in so-called "hard switching" mode (HSM). HSM refers to switching in which the inverter switching devices block voltage while simultaneously conducting current during transition between on and off. Power loss is incurred during this period of simultaneous voltage across the device and current through the device. This power loss is referred to as VI turn-on loss and VI turn-off loss to indicate, that for HSM, power loss is incurred each switching cycle during the turning on and turning off the switching device. Because switching losses are incurred every time the device turns on and off, higher device frequencies result in greater switching losses.

Losses associated with turning the switching device on include the VI turn-on loss, conductivity modulation loss (for bipolar device) and capacitance discharge loss, while losses associated with turning the switching device off include the VI turn-off loss and tail current loss (in some device under certain conditions).

Diode Losses

The diode of the inductive inverter circuits incurs conduction losses (typically a function of device design and current), conduction modulation losses (incurred when the switching device is turned on), and reverse recovery losses (incurred when the switching device is turned off).

Typical losses are described more fully below in reference to FIG. 1, which illustrates a hard switching circuit in accordance with the prior art. Switching circuit 100, shown in FIG. 1 is an HSM circuit, which may be used to explain the noted sources of switching losses. Switching circuit 100 includes an IGBT switching device 105 with its collector 106 connected to the positive end 111 of a DC source voltage 110 having a voltage value of E volts. The emitter 107 of the IGBT switching device 105 is connected to an inductor 115 representing the lead inductance in series with the IGBT switching device 105. The inductor 115 is in-turn connected to inductors 120 and inductor 130.

Inductor 120 represents the lead inductance of diode 125 and is in-turn connected to the cathode 126 of diode 120. Inductor 130 is a large filter inductor and is connected in-turn to the positive end 136 of filter capacitor 135 and the positive side 141 of the load 140.

A transistor drive circuit 145 is connected to the base 108 of the IGBT switching device 105. The negative end 112 of the DC source voltage 110, anode 127 of diode 125, the negative end 137, of capacitor 135, and the negative side 142, of the load 140, are connected to ground 150.

FIGS. 2A-2F illustrate the time during which various power losses occur and the magnitude of the losses in regard to the switching circuit 100 of FIG. 1 in accordance with the prior art.

VI Turn-Off Loss

FIG. 2A illustrates VI turn-off loss. When switching off the IGBT switching device 100 (switch), the currents and current paths do not change (assuming there is a large filter inductor) until the voltage across the switch is higher than the DC source voltage 110, at which time the current will start to fall. As shown in FIG. 2A the current through the switch, represented by solid line 205, is constant from time t0 to time t1 during which the voltage across the switch, represented by dashed line 210 rises to the level of the DC source voltage 110. When the voltage across the switch reaches the level of the DC source voltage 110 (e.g., at time $t_1$), the current will fall until it reaches zero (at time $t_2$). Note that FIG. 2A assumes no tail current (described below) in the switch.

When the switch is turned off, the current commutates to the diode 125 as follows. The current decays at a rate determined by the size of the inductors 115 and 120 and the voltage level above the DC source voltage 110. That is, when the voltage across switch is higher than DC source voltage 110, the amount of voltage over and above the DC source voltage 110 will divide between inductors 115 and 120 with the end 117 of inductor 115 and the end 121 of inductor 120 being positive. The voltage will divide in the ratio of the size of inductors 115 and 120 such that −di/dt of inductor 115 will be equal to the +di/dt of inductor 120. This process will continue until the current reaches zero in the switch. When the current reaches zero the voltage across the switch will drop to approximately the voltage level of the DC source voltage 110.

As shown in FIG. 2A, the VI turn-off power loss is represented by hatched area 215 and occurs during the period in which the voltage across the switch begins to rise and before the current falls to zero (e.g., from time t0 to time t2). The VI turn-off loss is typically the highest of the switching losses and can be substantial especially for circuits employing HSM. For example, for a typical system in which the current is 1,000 amps (A) and the voltage is 600 volts (V), the power loss at the peak power point (e.g., time $t_1$) is 600 kilowatts (kW) and the average power loss is approximately 300 kW over the time $t_0$ to $t_2$. This time may typically approach 10% of the switching period resulting in a VI turn-off loss of 30 kW.

Tail Current Loss

While the VI turn-off loss applies to circuits implementing a bi-polar device as well as to circuits implementing a field effect transistor (FET), an additional turn-off loss, particular to most circuits implementing a bi-polar switching device is the tail current turn-off loss (tail current loss).

FIG. 2B illustrates tail current loss. As shown in FIG. 2B, the voltage represented by dashed line 225 is the same as that shown in FIG. 2A and the current represented by solid line 220 falls in a manner similar to that shown in FIG. 2A during the period from time $t_1$ to time $t_2$. The size of inductors 115 and 120, and the voltage level across the switch above the DC source voltage 110 determines the rate at which the current decays until time $t_2$. For most bi-polar device, a point (e.g., time $t_2$) is reached at which the switching device itself determines the current decay rate and the current decays at a slower rate thereby increasing the power loss. The power loss between time $t_2$ and time $t_3$ is the tail current loss. The cause and extent of tail current losses are complex, but are generally due to charges stored in the device due to minority carrier injection that occurs with current conduction through most bipolar devices and determined by the voltage and current turn-off conditions and the switching time. For example, for a switching device implementing an IGBT, a lower voltage rating of the switching device for a given voltage at turn-off, results in a lower tail current because there will be fewer stored charges in the device in its saturated, on-state, condition.

The tail current losses are typically much lower than the VI turn-off losses from time $t_0$-time $t_2$. If the VI turn-off loss is reduced and the circuit is switched at substantially higher frequencies, the tail current losses at such higher switching frequencies may be substantially greater than typical VI turn-off losses at a lower frequency. It is for this reason that the tail current losses are considered a significant disadvantage of typical prior art schemes.

VI Turn-On Loss

FIG. 2C illustrates VI turn-on loss. When the switch is turned on, the current across the switch starts to rise as soon as the voltage across the switch begins to fall. As shown in FIG. 2C the current through the switch, represented by solid line 235 does not begin to rise until the voltage, represented by dashed line 240, begins to fall (i.e. at time $t_1$). Therefore from time $t_0$ to time $t_1$ there is no VI turn-on loss. The VI turn-on power loss is represented by hatched area 245 and occurs during the period in which the current across the switch begins to rise and before the voltage falls to zero (e.g., from time $t_1$ to time $t_2$). The VI turn-on loss depends on the rate at which the voltage falls and the rate at which the current rises. If the voltage falls during the same period in which the current rises, then the VI turn-on loss would be similar to that shown in FIG. 2A (though not as great because upon turning off the switch the current doesn't begin to fall until after the voltage has risen above the DC source voltage). If the time required for the current to rise is greater than the time required for the voltage to fall, then the VI turn-on loss is reduced proportionally.

When turning the switch on, if the voltage drops to substantially 0 V before the current starts to rise, then the switch will have no (or negligible) VI turn-on loss. In some soft switching topologies (one or more switching losses not present), discussed more fully below, this condition is the result of the voltage and current timing effects of the circuit topology (e.g., the inductors and capacitors added to the circuit to attain soft switching). This is illustrated in FIG. 2E in which the voltage represented as dashed line 270 falls to near 0 volts at a time (e.g., time $t_1$) prior to the time (e.g., time t2) at which the current represented as solid line 265 begins to rise.

Conductivity Modulation Loss

While the VI turn-on loss applies to circuits implementing a bi-polar device as well as to circuits implementing a field effect transistor (FET), an additional turn-on loss, particular to circuits implementing a bi-polar switching device is the conductivity modulation loss (CM loss), also referred to as conduction modulation loss.

FIG. 2D illustrates the CM loss for a switch implementing a bi-polar device. As shown in FIG. 2D, the current through the switch represented by solid line 250 is the same as that shown in FIG. 2C and the voltage across the switch represented by dashed line 255 falls in a manner similar to that shown in FIG. 2C during the period from time $t_1$ to time $t_2$. From time $t_2$ to time $t_3$ conductivity modulation occurs increasing the turn-on loss. This period is referred to as conductivity modulation time.

In a bipolar device, the n-region (assuming this is the region that is predominantly responsible for blocking voltage in the off state) of the device, just after starting to conduct current, has a higher effective resistance than it has after the current has been flowing for some time. As the current flows the effective resistance of the n-region goes down since minority carriers injected into the n-region (by initial current flow) reduce the n-region resistivity and thus modulate the conductivity. After several microseconds (starting at time $t_2$ in FIG. 2D), the forward voltage drop of the bipolar device will reach its DC forward drop voltage (at time $t_3$ in FIG. 2D) for the current flowing. For example, the forward drop of a bi-polar transistor device at full load (e.g., 100 A) may be 40 V. After the current has been flowing for some time (e.g., 10 microseconds) the forward load may drop to 2 V. The resistance has changed from 0.4 ohms to 0.02 ohms (e.g., the resistance of the device has been modulated as the device conducts current).

The turn-on losses of a switch implementing a bi-polar device are represented by hatched area 260 and occur during the period in which the current through the switch begins to rise and before the voltage falls to zero (e.g., from time $t_1$ to time $t_3$). The CM losses are those losses between time $t_2$ and time $t_3$.

The CM losses are typically much lower than the VI turn-on losses. For example, the CM losses are typically about 20% of the VI turn-on losses. If the VI turn-on loss is reduced and the circuit is switched at substantially higher frequencies, the CM losses at such higher switching frequencies may be substantially greater than typical VI turn-on losses at lower frequencies. It is for this reason that CM losses, like tail current losses described above, are considered a significant disadvantage of typical prior art schemes.

Circuits implementing a bi-polar device and having topologies that result in the voltage dropping to near 0 volts before the current starts to rise will still have CM losses. Such CM losses are illustrated in FIG. 2F in which the voltage represented as dashed line 285 is at or near 0 volts until the current represented as solid line 280 begins to rise at time $t_1$. The voltage rises as the current rises from time $t_1$ to time $t_2$ due to conduction modulation. The voltage then falls to a low voltage at a time $t_3$. The conductivity modulation losses represented by hatched area 290 are incurred from time $t_1$ to time $t_3$.

Capacitive Loss

All switching devices have a capacitance across their power terminals. The capacitance is from the collector to emitter in IGBTs and bi-polar transistors. When the switching device turns on, the capacitance is discharged into the switching device. The energy stored in the capacitor is absorbed in the switching device itself and becomes part of the turn-on switching losses. Typically the energy absorbed is small, even at high frequencies. Soft switching topologies exist that naturally discharge the capacitance before the switching device is turned on with no added circuitry.

Free Wheeling Diode Switching Loss

The switching losses described above did not take into account the sweep out current of the free wheeling diode 125 of FIG. 1 during turn-on. That is, when the switch is off, current is freewheeling through a filter inductor. When the switch is turned on, the current of the diode is reversed until the diode starts to block. At this point, the voltage across the diode increases dramatically resulting in substantial losses in the diode with a corresponding current over shoot in the current in the switching device 105, and significantly more switching loss in the switching device 105, which is not illustrated in FIG. 2C.

Soft-Switching Topologies

There are soft switching topologies that do not have diode turn-on switching loss (e.g., the diode is blocking voltage prior to turn on). For HSM, especially under high voltage conditions, the sweep out current is very high and increases the losses during turn-on to several times that shown in the FIGS. 2A and 2B.

Some attempts have been made to make inverter circuits using so-called "soft switching" mode (SSM) in which the voltage is switched when current through the device is zero, or where the current is switched when voltage across the device is zero. For circuits operating in SSM, one or more of the major switching losses is not present. Soft switching is achieved by using inductors and capacitors to delay current and/or voltage changes. This can result in increased costs and generate undesirable circuit conditions and fault requirements. Moreover, SSM applications reduce either the VI turn-on switching losses or the VI turn-off switching losses, but normally do not address both losses.

Other attempts to address switching losses through varied circuit topologies or modulation schemes have been made but these have not addressed all switching losses in one circuit. For example, some schemes have included loss-reduced snubbers, filters, or additional power devices to assist and/or share current or voltage during switching to reduce VI turn-off losses in the main conduction device, but without addressing VI turn-on losses due to the free wheeling diodes. For example, for low power applications using a metal-oxide semiconductor (MOS) device to control switching in voltage source inverters may employ fast switching and snubbering to reduce VI turn-off losses, but VI turn-on losses and free wheel diode losses remain. CM losses, which are a function of device design, may typically be reduced by modifying the device design, however, this may result in increased switching losses.

Other efforts have been made to address VI turn-on loss, but without addressing VI turn-off loss, diode loss, or other losses such as CM losses and tail current losses incurred with bipolar devices typically employed in high power applications. For such devices, switching losses are typically the determining factor in power handling limitations and in frequency limitations.

SUMMARY OF THE DESCRIPTION

An inverter switching circuit for reducing switching losses. The circuit has a switching device and a voltage source electrically coupled to the switching device, the voltage source providing a normal operational voltage for the inverter switching circuit. The switching device also includes a switching voltage reduction mechanism for substantially reducing the voltage across the switching device, relative to the normal operational voltage, during a turn-off time of the switching device, the switching voltage reduction mechanism maintaining a substantially reduced voltage across the switching device during at least a portion of a tail current loss time of the switching device. The switching voltage reduction mechanism is also used during the turn-on of a switching device to reduce the turn-on switching losses according one embodiment. In one embodiment, the voltage reduction mechanism is implemented as a transformer circuit electrically serially implemented between the voltage source and the switching device.

This application addresses all the significant switching losses in each embodiment. This is done with added circuitry and sometimes in conjunction with a soft switching topology. It also addresses a modulation technique where the switching losses are significantly (e.g., approximately 50%) reduced with logic changes only in multi-switch PWM inverters. This is done by using a modulation technique that does not turn off which ever switch is carrying the most current during each PWM cycle.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 8A-8I are schematic diagrams illustrating various configurations of circuits for reducing power losses of a switching power converter according to certain embodiments.

FIGS. 10C-10G are diagrams illustrating an exemplary soft-switching topology according to one embodiment of the invention.

DETAILED DESCRIPTION

Figure 1:
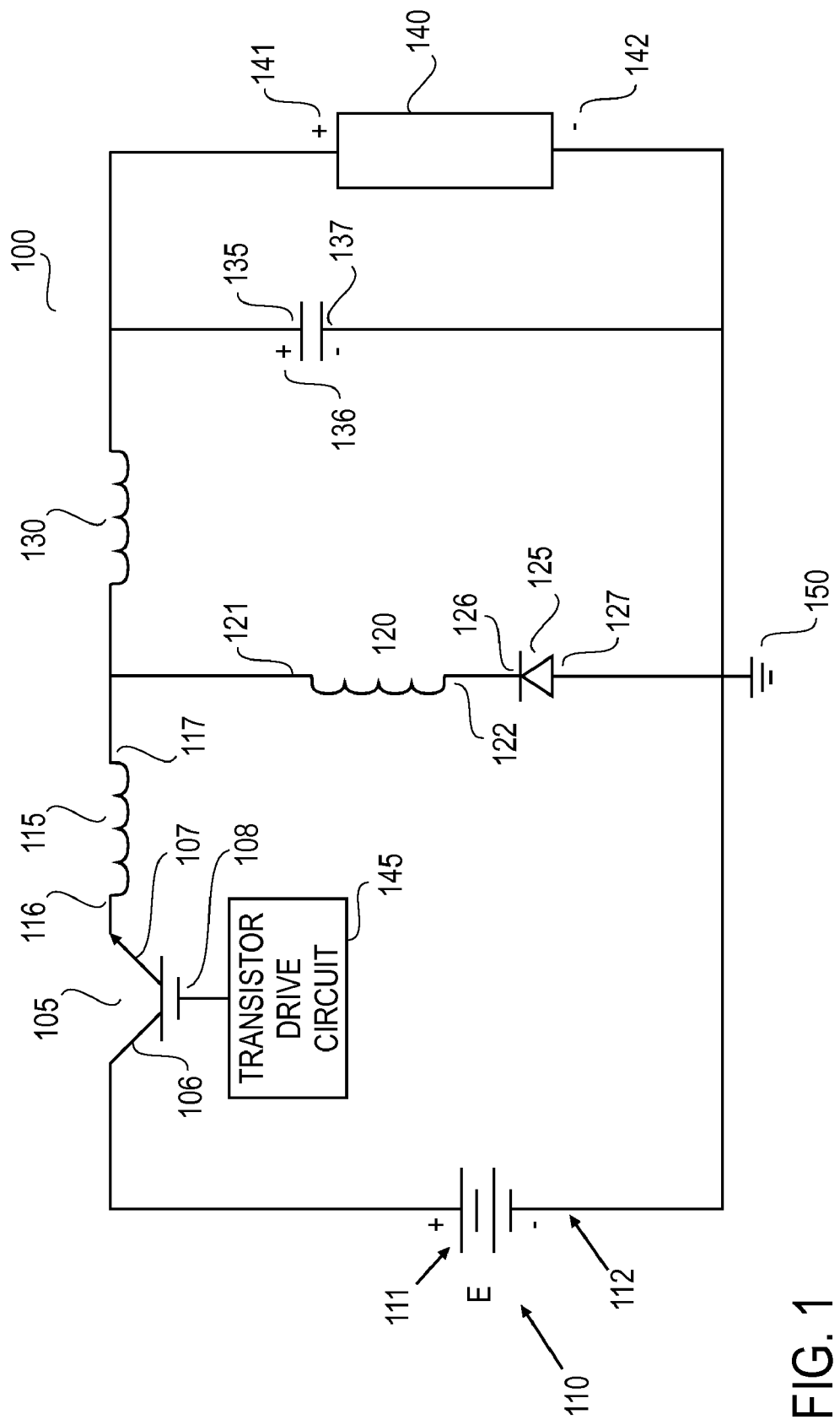
FIG. 1 is a schematic diagram illustrating a conventional switching circuit.

Power losses reduction in switching power converters is described herein. Embodiments of the invention provide methods and apparatuses for substantially concurrently eliminating or substantially reducing two or more switching losses in an inverter switching circuit. Embodiments of the invention substantially concurrently reduce multiple types of switching losses under HSM and SSM for active switching devices and diodes.

Embodiments of the invention provide substantial reduction or elimination of switching losses, thereby improving efficiency, enabling higher power ratings for a given size of equipment, reducing the size of required heat sinking to manage the losses, and also enabling much higher switching frequencies to be used.

Embodiments of the invention significantly reduce all or most of the sources of switching losses substantially concurrently and therefore provide virtually lossless switching with existing device types. Moreover, with such reduced-loss switching, greater reduction in system losses and hardware cost can be obtained by optimizing the switching device DC forward drop design without consideration of the switching loss tradeoffs as required by prior art schemes.

In one embodiment of the invention, a high-speed switching device (e.g., a FET) is implemented in parallel with the bi-polar switching device of the switching circuit to substantially reduce the VI turn-off loss. In one embodiment, the FET is left turned on long enough to substantially reduce the tail current loss.

In one embodiment of the invention, a saturable reactor circuit is implemented in series with the bi-polar switching device to substantially reduce VI turn-on loss. Additionally, for an alternative embodiment, a resistor is implemented in parallel with the saturable reactor to substantially reduce CM loss.

In one embodiment of the invention, switching device turn-on losses, switching device turn-off losses and diode losses are addressed substantially concurrently in order to provide reduced-loss switching without incurring additional fault conditions (e.g., actually significantly reducing the fault conditions of conventional circuits). In one embodiment, turn-on losses may be reduced by delaying the current through the device until a predetermined time period, also referred to as a pre-conditioning period, has passed in which the device is somehow saturated. As a result, the device can conduct current without current rise loss and/or without CM loss. In one embodiment, turn-off losses may be reduced by deferring application of a voltage until the device has been prepared to block a voltage without incurring loss, for example, by removing stored charges and/or recovering the device before full voltage is applied. In one embodiment, diode losses may be reduced by switching the diode during the pre-conditioning period of switching device prior to turning on. In another embodiment, the diode switching losses may be reduced by using a topology in which the diode is supporting a voltage before the voltage across the diode goes to a relatively high value (e.g., there is little or no reverse sweep out current in the diode).

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Processes

Figure 2A:
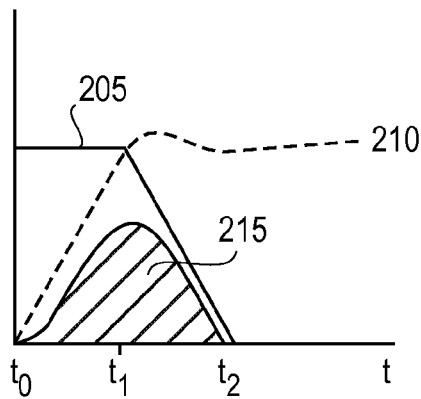
FIGS. 2A-2F are diagrams illustrating the time during which power loss occurs and the magnitude of the loss of a typical switching circuit.
Figure 3:
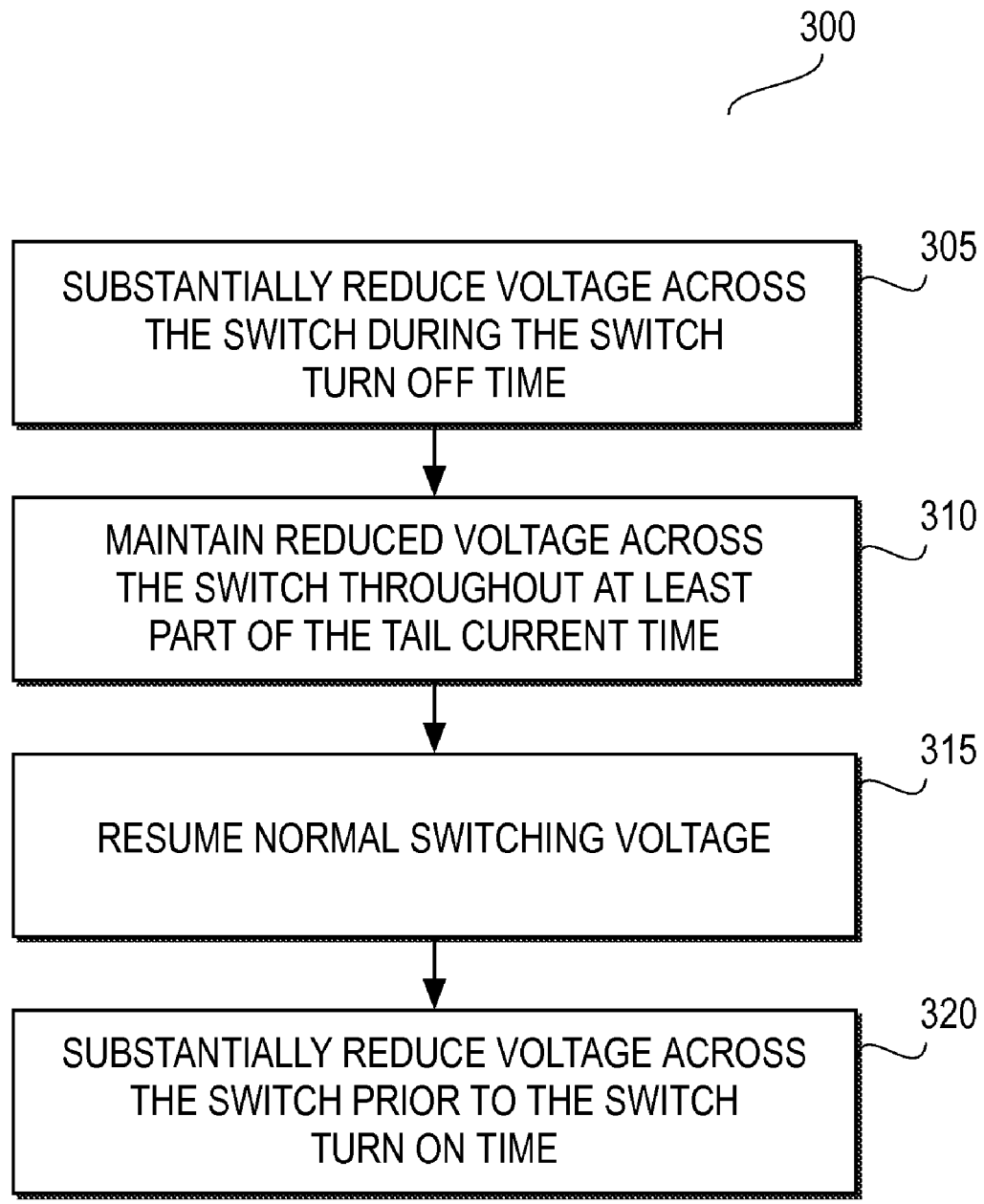
FIGS. 3 and 3A are flow diagrams illustrating a process for reducing multiple losses of a switching device in accordance with certain embodiments of the invention.

FIG. 3 illustrates a process by which multiple losses of a switching device are substantially reduced in accordance with one embodiment of the invention. Process 300, shown in FIG. 3, includes operation 305 in which the voltage across a switch is substantially reduced during the switch turn-off time. For example, the voltage across the switch may be reduced to one-tenth of the normal switching voltage. The voltage across the switch is kept low during the VI turn-off loss time. That is, the time in which the current through the switch falls to approximately zero ampere (e.g., until time t2 of FIG. 2A). Because the voltage across the switch is substantially reduced, the VI turn-off loss is likewise substantially reduced.

Figure 2B:
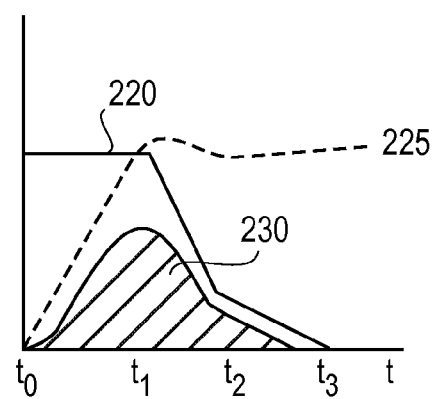

At operation 310, for circuits implementing a bi-polar switching device, the substantially reduced voltage across the switch is maintained throughout the tail current time (e.g., until time t3 of FIG. 2B). Maintaining the substantially reduced voltage across the switch provides substantially reduced tail current losses in addition to substantially reduced VI turn-off losses.

In accordance with various embodiments of the invention, various circuit topologies may be implemented which substantially reduce the voltage across the switch during the VI turn-off loss time and/or tail current loss time. Several such circuit topologies will be discussed in greater details below in accordance with various described embodiments. It will be apparent to those skilled in the art that many more such circuit topologies are possible.

Figure 2C:
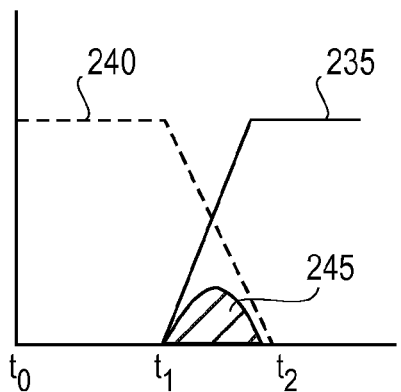

At operation 315 the voltage across the switch is allowed to return to normal switching voltage (e.g., approximately the source voltage 110 of FIG. 1). At operation 320 the voltage across the switch is substantially reduced prior to the switch turn-on time. That is, prior to the time at which the current begins to rise (time t1 of FIG. 2C).

As noted above, there are SSM topologies that provide a substantially reduced voltage across the switch prior to the current beginning to rise. However, embodiments of the invention substantially reduce voltage across the switch prior to the switch turn-on time using HSM topologies, discussed below, that do not have the noted disadvantages of SSM topologies. Because the voltage across the switch is substantially reduced, the VI turn-on loss is likewise substantially reduced.

The capacitive loss is also substantially reduced. The capacitive losses, the energy absorbed in the device when the switch is turned on, are approximated by equation 1.

$$\text{Power loss} = \frac{1}{2} \cdot C \cdot V^2 \cdot f \quad (1)$$

Where C is the effective capacitance of the across the switch, V is the voltage across the switch, and f is the switching frequency. Therefore, a substantial reduction in the voltage across the device will result in an even more substantial reduction in capacitive loss.

Moreover, the diode switching loss is substantially reduced as well. That is, substantially reducing the voltage across the switch at turn-on time prevents the dramatic increase in voltage across the diode that results in freewheeling diode switching loss. Therefore, with a reduced voltage across the device at switch on time, the loss in switching device 22, due to the sweep out of the diode, is very small relative to when VI turn-on loss and CM loss are present at full voltage. This applies to systems designed to run with lower losses at a given frequency (e.g., 3 KHz) or, alternatively, designed to run at much higher frequencies (e.g., 30 KHz to 300 KHz).

Thus, embodiments of the invention substantially reduce the voltage across the switch at specific times and for specific durations thereby substantially and concurrently reducing some or all of the VI turn-off loss, VI turn-on loss, tail current loss, capacitive loss, and freewheeling diode switching loss. The amount the losses are reduced is proportional to the reduction in voltage. For purposes of this discussion a substantial reduction in voltage means a reduction to 50% or less of the normal switching of the device.

Conductivity Modulation Loss

Process 300, described above in reference to FIG. 3 provides substantially reduced VI turn-off loss, VI turn-on loss, tail current loss, capacitive loss, and freewheeling diode switching loss, but does not address CM loss. That is, because CM loss is a function of the current and not the voltage across the switch, substantially reducing the voltage at turn-off time and turn-on time will not address CM loss. CM loss is typically approximately 20% of the VI turn-on loss, while the VI turn-on loss is approximately 50% of the VI turn-off loss. Therefore CM loss is not significant compared to the aggregate of the other losses addressed through process 300. However, once the VI turn-off loss, VI turn-on loss, tail current loss, capacitive loss, and/or freewheeling diode switching loss have been addressed, it becomes practical to switch at higher frequencies. At higher frequencies, the CM loss becomes substantial and cannot be ignored in many cases.

Figure 2D:
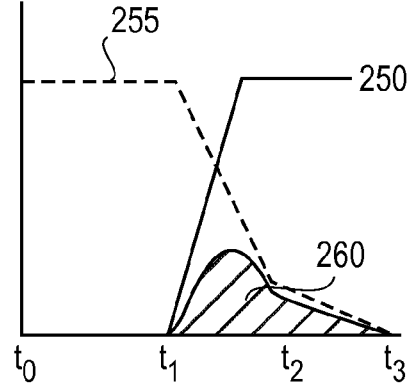

Embodiments of the invention, therefore, address the CM loss by substantially reducing the current during conductivity modulation time (e.g., time t1 through time t3 of FIG. 2D). The full switching current is not required to lower the effective resistance of the switch. Therefore, in accordance with one embodiment of the invention, a substantially reduced current (e.g., 10% of the normal switching current) is employed prior to the switch turn-on to lower the effective resistance. The reduced current is maintained until conductivity modulation is effected. The substantially reduced current results in proportionally reduced CM loss.

Figure 3A:
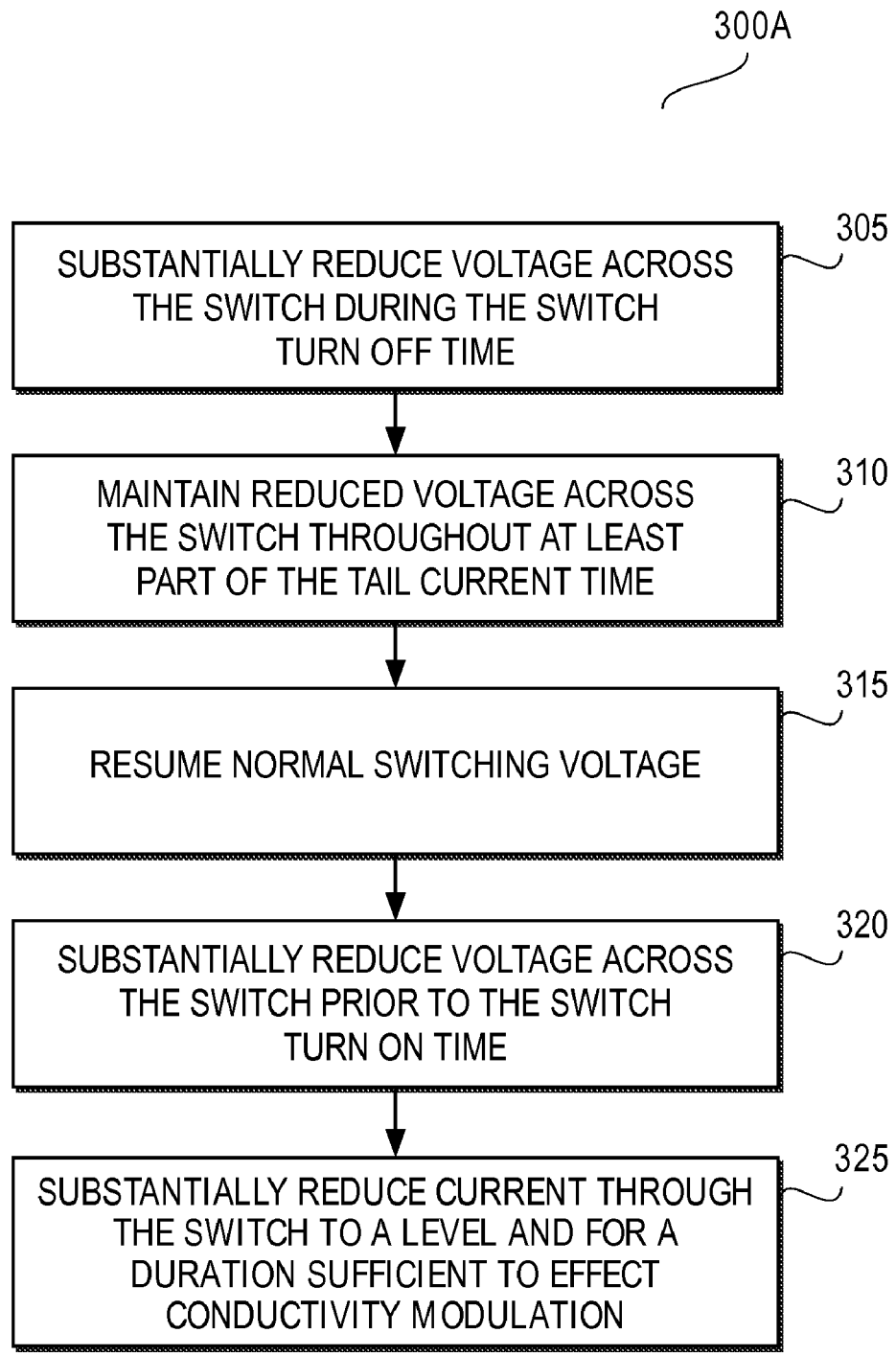

FIG. 3A illustrates a process that includes substantially reducing the current in the switch during switch turn-on to reduce CM loss in accordance with one embodiment of the invention. Process 300A, shown in FIG. 3A, includes operation 305-320 as described above in reference to process 300 of FIG. 3. Process 300A also includes operation 325 in which the current through the device is substantially reduced prior to the switch turn-on. The current is reduced to a level that is sufficient to effect conductivity modulation and is maintained until conductivity modulation is effected.

Exemplary Circuit Topologies

In one embodiment of the invention, the VI turn-off losses and/or the tail current losses are substantially reduced by holding the voltage across the switching device relatively low (e.g., compared to the switching voltage) during the VI turn-off loss time and the tail current loss time of the switching device.

Figure 4:
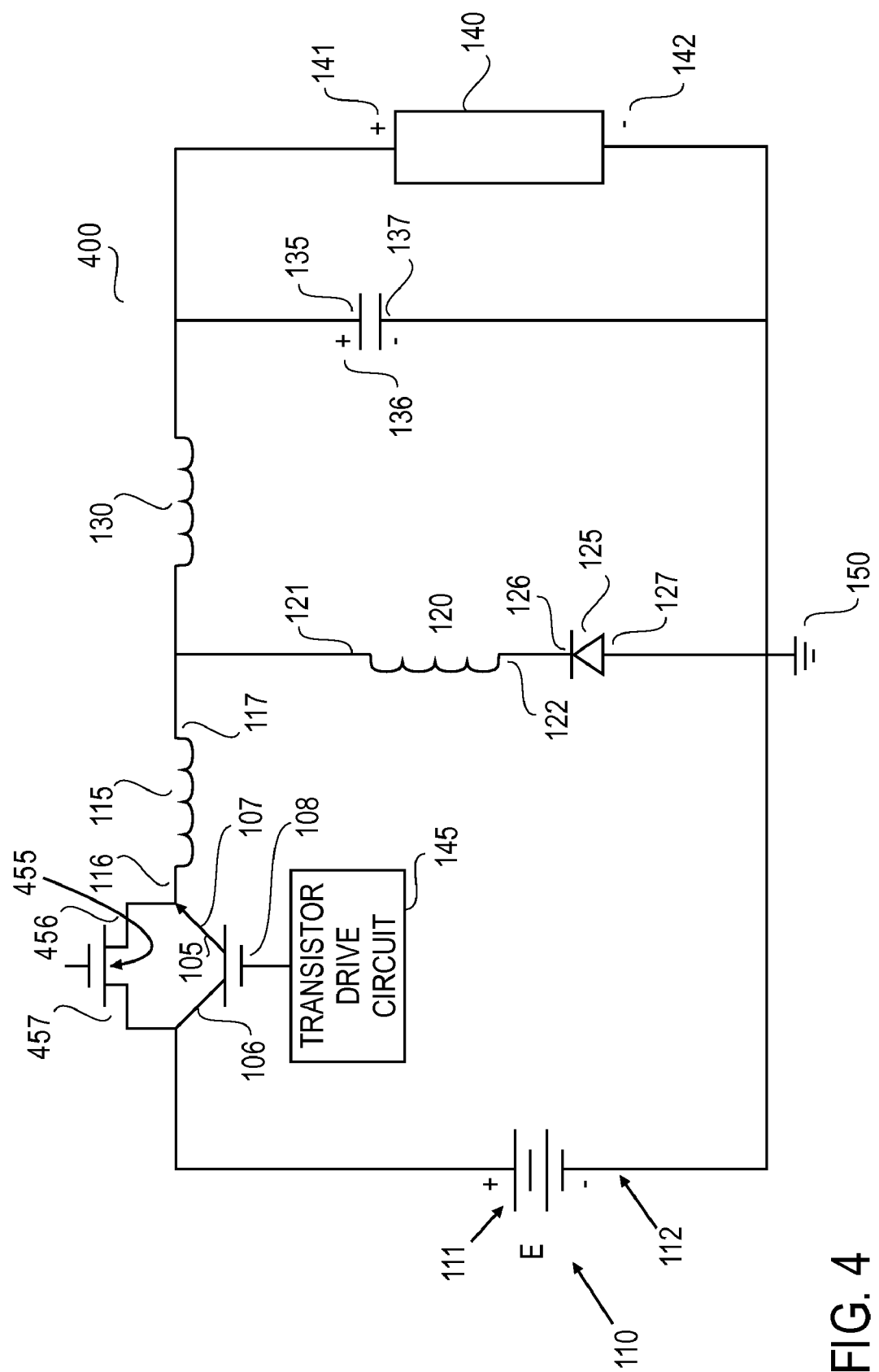
FIG. 4 is a schematic diagram illustrating an exemplary circuit that may be used to reduce power losses of a switching device, according to one embodiment.

FIG. 4 is a schematic diagram illustrating an exemplary circuit that may be used to reduce power losses of a switching device, according to one embodiment. In this circuit example, a switching circuit includes a high-speed switching device in parallel with a bi-polar switching device. Referring to FIG. 4, circuit 400 operates in a similar manner to circuit 100 described above in reference to FIG. 1, and the same reference numbers are used to identify the same circuit components. As shown in FIG. 4, according to one embodiment, a FET 455 is implemented in parallel with the IGBT switching device (IGBT) 105 with the FET source 456 connected to the IGBT emitter 107 and the FET drain 457 connected to the IGBT collector 106. The IGBT is exemplary and could be replaced by any bi-polar device (e.g., GTO, IGCT, bi-polar transistor, etc.) in alternative embodiments. Likewise the FET 455 may be implemented as any fast switching device in alternative embodiments.

In general, the FET 455 switches much faster than IGBT 105 and typically, a FET may switch 10-100 times faster than an IGBT. Note that the voltage across the FET is relatively low before it turns on. The faster switching and the relatively low voltage result in reduced VI turn-off switching loss. For example, the VI turn-off loss of the FET may only be 0.5%-5% of the VI turn-off loss for an IGBT. Therefore, sometime (e.g., a predetermined period of time) prior to a desired turn-off time, in one embodiment, the IGBT 105 is turned off and the FET 455 is turned on. The current goes through the FET 455 instead of the IGBT 105 so that there is no or less VI turn-off loss associated with the IGBT 105, only a greatly reduced VI turn-off loss associated with the FET 455, which is much less than those associated with the IGBT 105.

Moreover, a FET, inherently, has no or less tail current loss, so if the FET is left turned on for a sufficient period, according to one embodiment, the tail current loss associated with the IGBT will be greatly reduced or eliminated. The FET 455 may be turned on and/or off by a control signal received at the gate of the FET 455. The gate of the FET 455 may be coupled to a separate drive circuit or the same drive circuit 145, with or without intermediate components in between.

To reduce VI turn-off loss and tail current loss, the IGBT 105 and the FET 455 are operated in the following manner. During a predetermined period of time prior to a desired switching circuit turn-off time, the FET 455 is turned on and concurrently the IGBT 105 is turned off. For a typical IGBT, this time period may be approximately 3-6 microseconds. When the FET 455 is turned on, the voltage across the FET 455 is relatively low and has a relatively low VI turn-on loss with virtually no CM loss.

The FET 455 is kept on for all or most of the time it takes the IGBT 105 to turn off, where off is defined as when the IGBT 105 having negligible or no tail current when the voltage appears on the IGBT 105. This maintains the voltage across the IGBT 105 at a low value during the VI turn-off loss time and tail current loss time. Therefore the VI turn-off losses of the IGBT 105 are substantially reduced as compared to conventional schemes (e.g., circuit 100).

When the IGBT 105 has regained its forward blocking ability and the tail current time has passed, the FET 455 is turned off. The remainder of the turn-off process is the same as that of circuit 100 as described above in reference to FIG. 1. The current commutates to the diode 125 in the following way. When the voltage across the IGBT 105 is higher than the DC source voltage 110, the amount of voltage higher than DC source voltage 110 will divide proportionally between inductors 115 and 120. This process will continue until the current reaches 0 A in FET 455. When the current reaches 0 A, the voltage across FET 455 will drop to approximately the level of the DC source voltage 110, thus substantially reducing the turn-off switching losses in the IGBT 105.

Figure 2E:
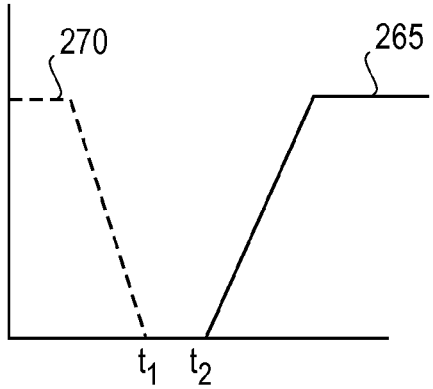
Figure 2F:
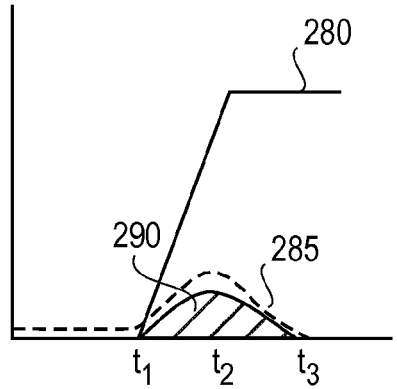
Figure 5:
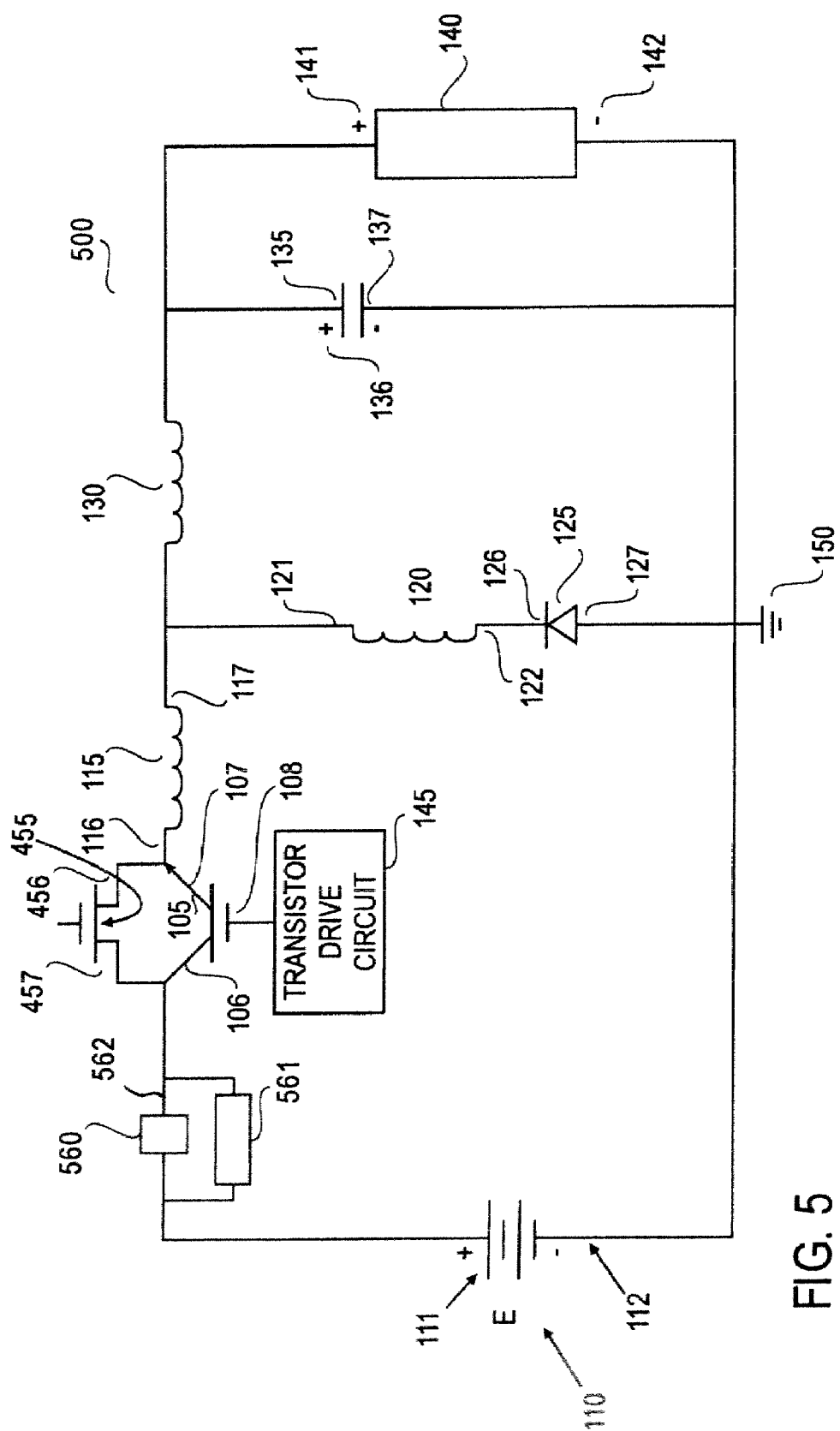
FIG. 5 is a schematic diagram illustrating an exemplary circuit that may be used to reduce power losses of a switching device according to another embodiment.

FIG. 5 is a schematic diagram illustrating an exemplary circuit that may be used to reduce power losses of a switching device according to another embodiment. In this example, the switching circuit includes a saturable reactor circuit in series with a bi-polar switching device. Note that circuit 500 operates in a similar manner to circuit 400 described above in reference to FIG. 4, and the same reference numbers are used to identify the same circuit components. Referring to FIG. 5, according to one embodiment, a saturable reactor 560 is implemented in series with the IGBT 105. The saturable reactor 560, which may be, for example, a near "square loop" saturable reactor, is constructed so as to have a saturation time sufficient to hold off the source voltage 110 until the voltage across switching device falls to approximately 0 V after being turned on, for example, as shown in FIG. 2E.

According to one embodiment, when IGBT 105 is turned on, the voltage across IGBT 105 falls, but only a minimal current (approximately 0.5 A–5 A) flows due to the high impedance of the saturable reactor 560. After the saturable reactor 560 is saturated, the current rises to normal switching current. Therefore, the saturable reactor 560 is selected such that its saturation time is sufficient to allow the voltage across the switching device (e.g., IGBT 105) to fall to near zero before the current begins to rise, thereby substantially reducing VI turn-on loss.

In use, the saturable reactor 560 time starts prior to the desired turn-on time of the switching device if the saturable reactor were not used. For example, if the saturation time of the saturable reactor is 3 microseconds, then the switching device is turned on 3 microseconds prior to the desired turn-on time of the switching circuit. During this time, the voltage across the switch falls to approximately 0 V with minimal current (e.g., only the coercive current of the saturable reactor).

Reset circuit 561 is used to reset the saturable reactor 560 by applying a positive voltage on end 562 of the saturable reactor 560 for a period sufficient to saturate the saturable reactor 560 in the opposite direction that it will be when full load current is flowing through IGBT 105. The resetting is achieved when IGBT 105 and FET 455 are off.

Figure 6:
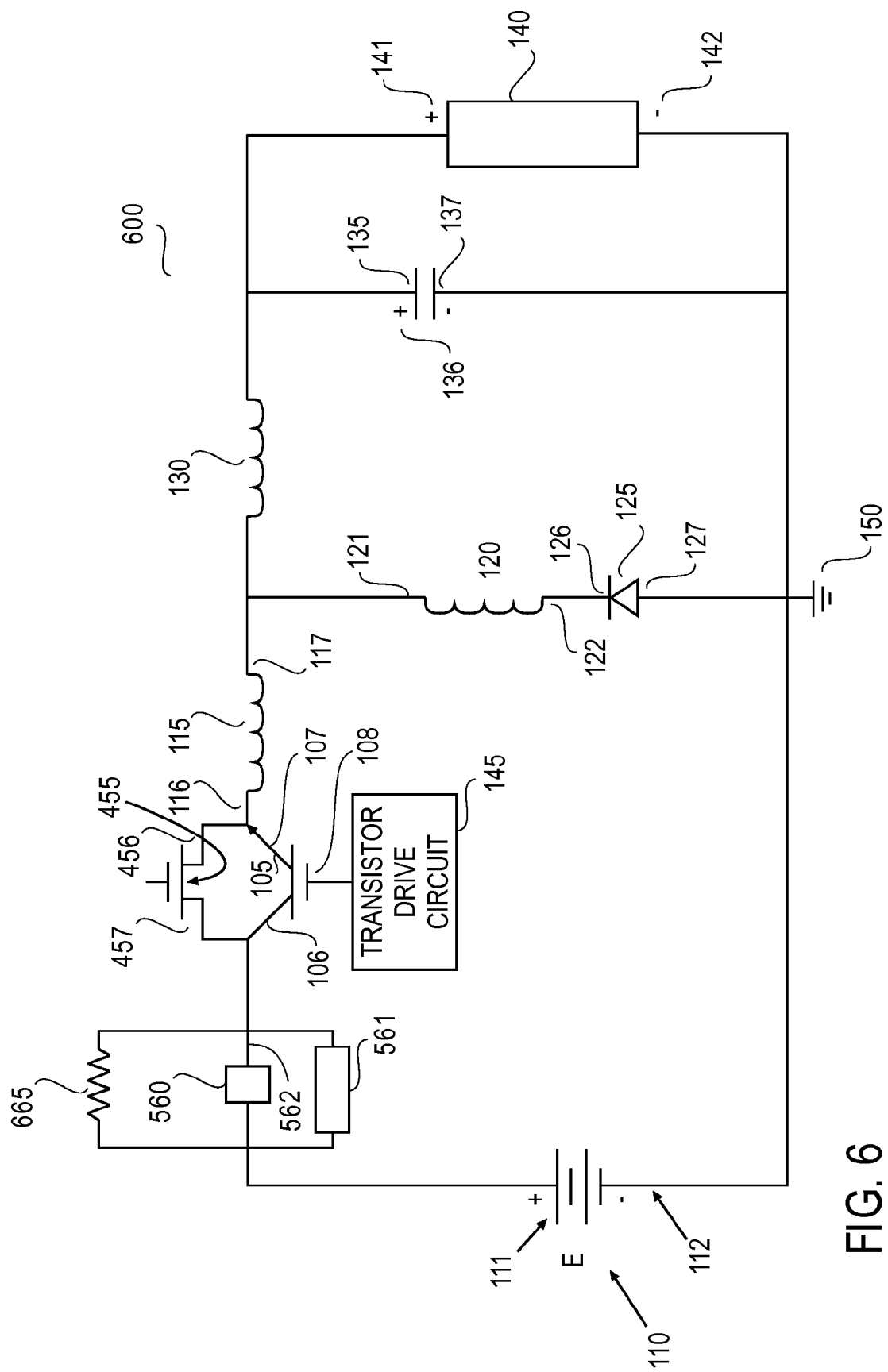
FIG. 6 is a schematic diagram illustrating an exemplary circuit for reducing power losses of a switching device according to another embodiment.

FIG. 6 is a schematic diagram illustrating an exemplary circuit for reducing power losses of a switching device according to another embodiment. In this example, a switching circuit includes a saturable reactor circuit and parallel resistor in series with a bi-polar switching device in accordance with one embodiment of the invention. Circuit 600, shown in FIG. 6, operates in a similar manner to circuit 500 described above in reference to FIG. 5, and the same reference numbers are used to identify the same circuit components.

As shown in FIG. 6, according to one embodiment, a resistor 665 is implemented in parallel with the saturable reactor circuit 560 and in series with the IGBT 105. The resistor 665 allows a current that is substantially lower than the full switching current, but sufficient to effect conductivity modulation. That is, the coercive current of the saturable reactor 560 which is typically approximately 1 A is not sufficient to lower the resistance through the switch. The resistor 665 allows a sufficient current to flow in order to effect conductivity modulation, that is, the current is reduced to a level that is sufficient to effect conductivity modulation and is maintained until conductivity modulation is effected. Therefore, when the saturable reactor 560 saturates, and the current rises to full switching current, the conductivity modulation has already occurred. In certain embodiments, resistor 665 may not be required when the switching device 107 is a non-bipolar device, since the non-bipolar device such as a FET has relatively less or no CM loss.

The value of the resistor 665 may be determined based on various considerations including the extent of CM loss reduction, the time required to overcome the CM effect, and the size and cost of the saturable reactor. For example, a higher current yields greater CM losses, but would reduce the cost of the saturable reactor because the saturable reactor time would be reduced.

Thus, circuits 400, 500, and/or 600 described above, concurrently and substantially, reduce or eliminate multiple switching losses in accordance with various embodiments of the invention. The inventive concepts of various embodiments enable significant reduction in the size and cost of power systems as well as significantly decreasing the losses in high power systems. The reduced losses realized by such circuits save power, reduce operating costs, and allow switching at higher frequencies and/or running at higher power as discussed more fully below.

Circuit 600 demonstrates one embodiment of an HSM circuit in which all of the major turn-on losses and turn-off losses are substantially reduced. For illustrative purposes, the operation of circuit 600 is provided. For initial conditions in which that the switching device is on and conducting current and the saturable reactor is saturated, the description of the operation of circuit 600 is as follows.

A short time (e.g., 0.3 to 6 microseconds) before the switching circuit is to be turned off, the FET 455 (or other fast switching device) is turned on and the IGBT 105 is turned off. The time is a function of the voltage rating and manufacturing process of the IGBT (or other bipolar device) being used. This time will depend on many circuit parameters, but in general, the FET 455 is kept on for a long enough time such that when it is turned off the IGBT 105 will be fully off and will not have any tail current when the voltage rises across the parallel combination of the IGBT 105 and the FET 455. In this way the VI turn-off loss and the tail current loss are substantially reduced because the switching losses in a FET are much lower than that of an IGBT (or other bi-polar device) and the FET has no tail current.

After the turn-off of the switching circuit is completed, the reset circuit 561 is turned on to reset the saturable reactor 560. At any time after the saturable reactor 560 has been reset, the IGBT 105 may be turned back on. When the transistor drive circuit 145 turns on (e.g., logically high), the voltage across the IGBT 105 will drop to a low voltage in a very short time. The voltage across the saturable reactor 560 will be slightly less than the source voltage 110. The current in the IGBT 105 will be slightly less than the source voltage 110 divided by the resistor 665. The current will not change until the saturable reactor 560 is saturated, at which time the current will quickly rise to the value that is flowing in filter inductor 130. Note that the switching losses in the diode 125 are relatively high thus limiting the maximum switching frequency of such circuits.

The saturating time of the saturable reactor 560 is set so that the current through the IGBT 105 will reduce the resistance of the n-region to near its saturated value with significantly less CM loss than there would be if the current rose to full load current as soon as the IGBT 105 is turned on. In this way the CM loss of the IGBT 105 is significantly reduced with the VI turn-on losses reduced to very near zero. This completes one cycle of operation of circuit 600.

Figure 7A:
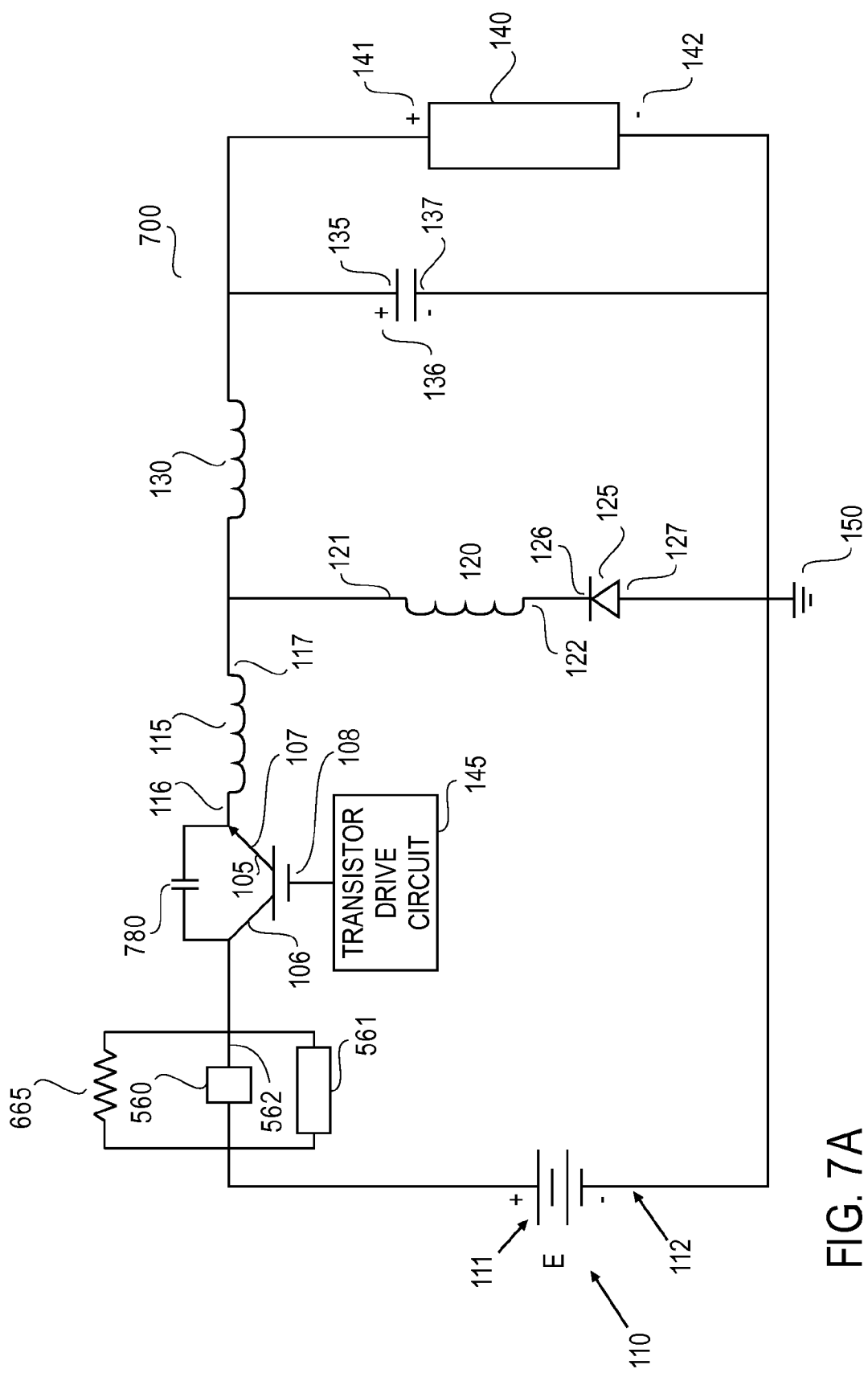
FIGS. 7A-7C are schematic diagrams illustrating exemplary circuits, which may be used to reduce power loss according to certain embodiments.
Figure 7B:
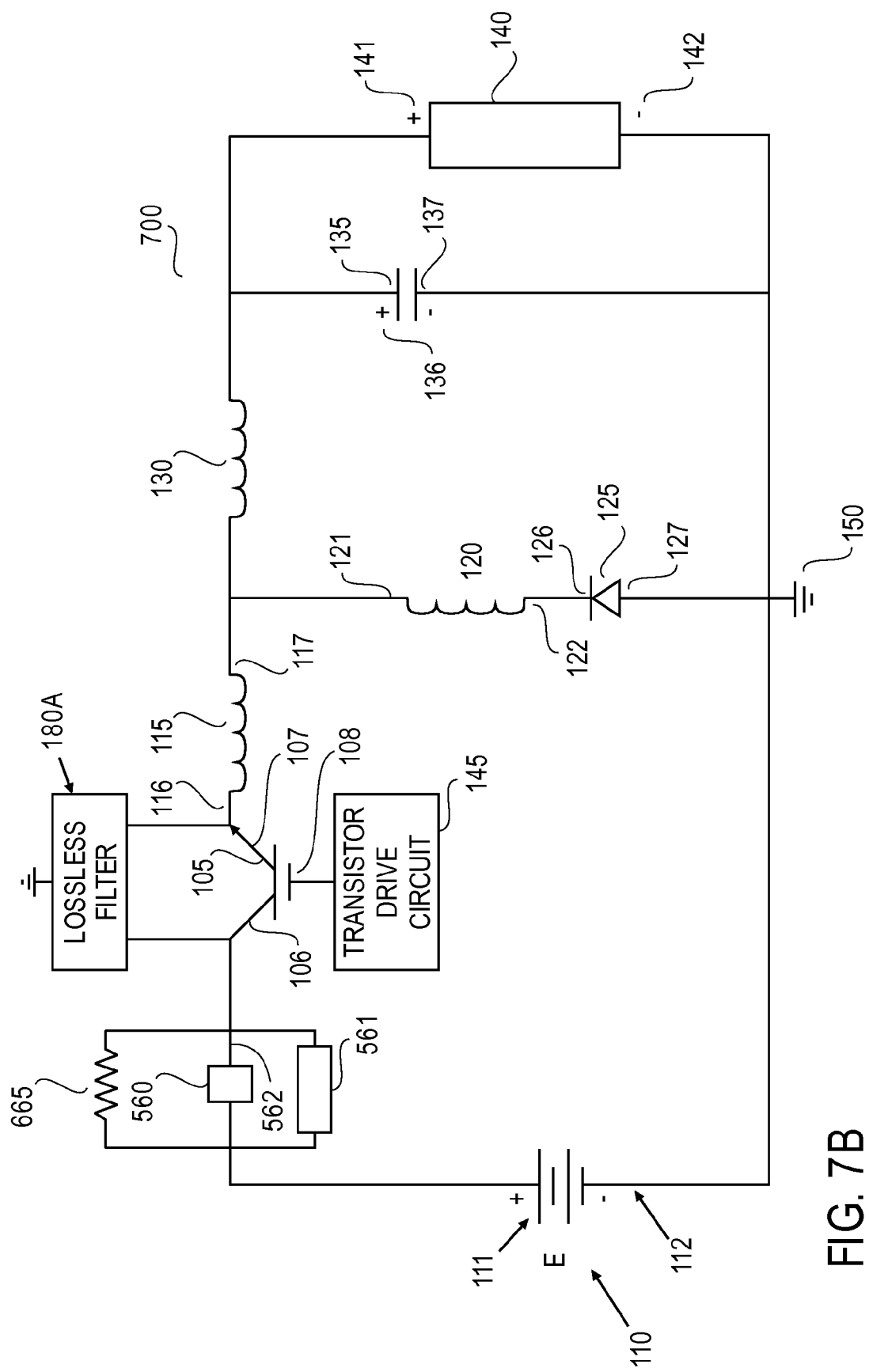

As discussed above, a FET may be used to substantially reduce the voltage across a switch to effect a reduction in VI turn-off loss and tail current loss. The use of the FET is such a manner is not without disadvantages. For example, commercially available FETs are relatively expensive and their implementation for high power applications is not practical. As noted, embodiments of the invention may substitute any fast switching device for the FET. For one alternative embodiment, in which the switching device is a bi-polar transistor, if a fast rise time/high turn-off current is used, according to one embodiment, the FET may be replaced with a small capacitor as shown in FIGS. 7A-7B for example. Such an approach may have much higher losses, but eliminates the requirement of expensive FETs.

FIG. 7A is a schematic diagram illustrating an exemplary circuit which may be used to reduce power loss according to another embodiment. In this example, a switching circuit includes a capacitor in parallel with a switching device in accordance with one embodiment of the invention. Circuit 700, shown in FIG. 7A according to one embodiment, operates in a similar manner to circuit 600 described above in reference to FIG. 6, and the same reference numbers are used to identify the same circuit components.

As shown in FIG. 7A, in place of FET 455, circuit 700 implements a capacitor 780. Capacitor 780 is near 0 V at switch turn-off. The current in the IGBT 105 is then transferred to the capacitor 780. The capacitor voltage rises over a predetermined period of time (e.g., the capacitor charge time). The capacitor value can be selected to provide a capacitor charge time that extends beyond some or all of the tail current loss time, thus reducing or eliminating VI turn-off loss and tail current loss. At turn-off, then, current flows into the capacitor 780. Therefore, because the current through the switching device 105 has been bypassed immediately through the capacitor 780, the VI turn-off losses are substantially reduced. If the charge time of capacitor 780 is of sufficient duration, then the tail current loss is substantially reduced as well.

Figure 7C:
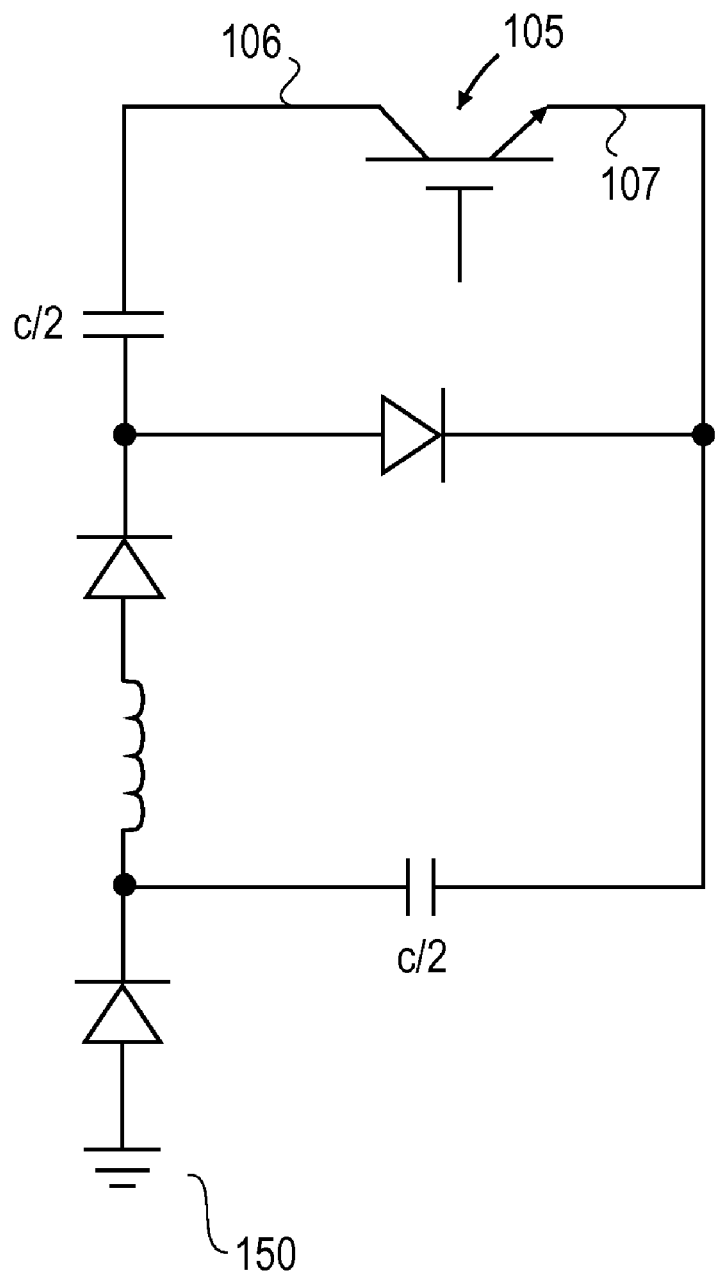

According to one embodiment, a lossless filter may be used instead of capacitor 780. FIG. 7B is a schematic diagram illustrating an exemplary circuit which may be used to reduce power loss according to another embodiment. In this example, a switching circuit includes a lossless filter 180A in parallel with a switching device in place of capacitor 780 of FIG. 7A. An exemplary embodiment of lossless filter 180A is also included in FIG. 7C. Note that the lossless filter 180A shown in FIG. 7C is shown for the purposes of illustration only. It would be appreciated that other types of lossless filters may also be implemented.

Figure 8:
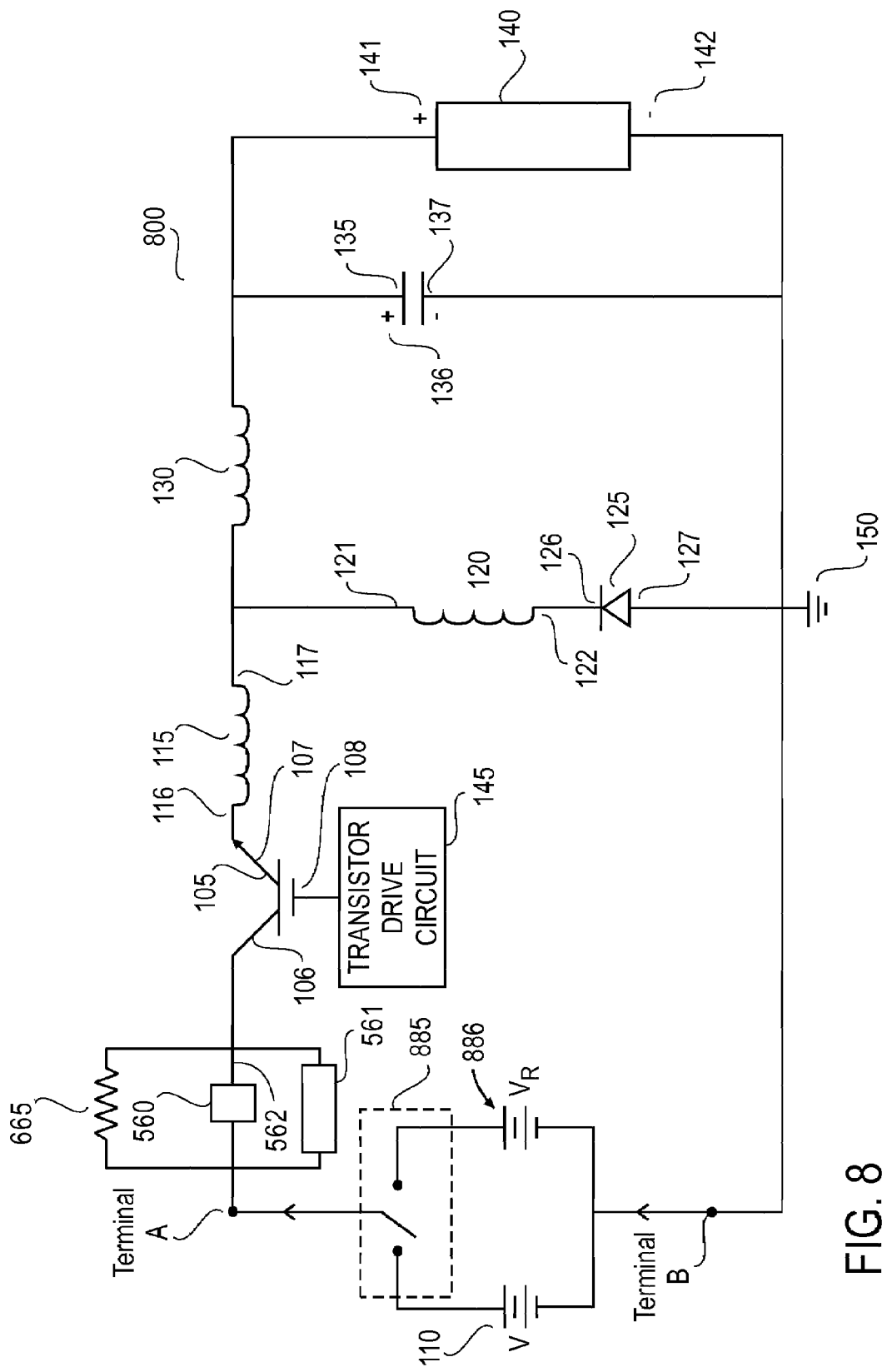
FIG. 8 is a schematic diagram illustrating a switching circuit for reducing power losses of a switching power converter according to one embodiment.

In accordance with certain embodiments of the invention, another way to reduce the switching losses in the switch, rather than bypassing the current, is to substantially reduce the source voltage during switching. FIG. 8 is a schematic diagram illustrating an exemplary circuit which may be used to reduce power loss according to another embodiment. In this example, a switching circuit includes a reduced voltage source to allow for reduced voltage switching in accordance with one embodiment of the invention. Circuit 800, shown in FIG. 8, operates in a similar manner to circuit 700 described above in reference to FIG. 7A, and the same reference numbers are used to identify the same circuit components. A circuit 885 that effects a single pole double throw (SPDT) switch is implemented in circuit 800 to allow a substantially reduced voltage, $V_R$, of voltage source 886 (e.g., a second voltage source in addition to a first voltage source 110), to be used during switching.

Reduced voltage $V_R$, may be some fraction of source voltage 110. Circuit 800 does not implement a FET, capacitor, or any other mechanism to bypass the current through IGBT 105, rather the current is allowed to flow. However, during switching and throughout at least a portion of the tail current loss time, the SPDT switch of circuit 885 is switched to voltage source 886. At switch turn-on, the core of saturable reactor 560 saturates as discussed above, and the voltage across the IGBT 105 is $V_R$, a substantially reduced voltage. Switching is then effected at the reduced voltage (e.g., the voltage the switch is turning off from is also substantially reduced). Therefore all of the losses are reduced. Because switching is effected at $V_R$, VI turn-off loss, tail current loss, VI turn-on loss, capacitive loss, and CM loss are significantly reduced by a factor of $V_R$ divided by the source voltage (V) 110. An advantage of such an embodiment is that switching losses of diode 127 are also reduced by several times this amount (e.g., in the order of 99% if $V_R$ is 10% of voltage source 110). Note that the ratio of the first voltage source 110 and the second voltage source 886 are described for the purposes of illustration only. It will be appreciated that other configurations may be applied.

For circuit 800, the size of the core of saturable reactor 560 is reduced proportional to the reduction in voltage (e.g., by a factor of $V_R/V$) to provide approximately the same saturation time. For example, if $V_R$ is 10% of the source voltage 110, the core of saturable reactor 560 may be approximately 10% of a core for normal switching voltage. Additionally, the value of resistor 665 is likewise reduced by a factor of $V_R/V$ to provide the current to effect conductivity modulation.

Such an embodiment provides several advantages including a reduced cost core, that is, a reduction in core size by a factor of 10 may correlate to a reduction in the cost of the core by a factor several times as great (e.g., cost reduction be a factor of 30).

In accordance with various embodiments of the invention, circuit 885 may be implemented in many ways as will be apparent to those skilled in the art. Moreover, reduction of the switching voltage can be effected in a variety of ways. Implementing an independent, reduced-voltage source (e.g., a reduced-voltage battery) is exemplary. Circuit 885 is exercised for a short time twice during the cycle of operation of the circuit 800; once just before the turn-off of switch 105, and again before the turn-on of switch 105. If running at low frequency, circuit 885 does not have to be exercised before the turn-on of switch 105, but would be, if the saturable reactor circuit was not used (e.g., when the CM losses are not reduced).

FIGS. 8A-8E are schematic diagrams illustrating various circuit configurations that may be used to reduce power losses of a switching power converter, according to certain embodiments of the invention. In these examples, a variety of configurations with respect to transformer circuit 885 between terminals A and B of FIG. 8 are illustrated; however, other configurations may be applied.

Figure 8A:
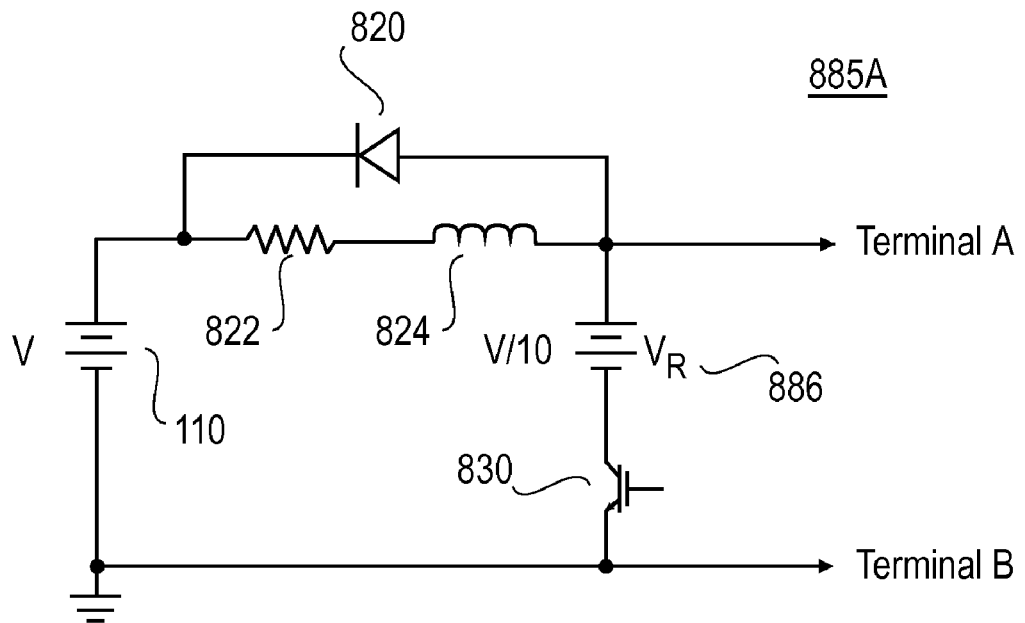

Referring to FIG. 8A, in this embodiment, circuit 885A may be used in place of circuit 885 of FIG. 8. According to one embodiment, circuit 885A includes, but is not limited to, a first voltage source 110 having a positive terminal coupled to a first end of a resistor 822 whose second end is coupled in series to a first end an inductor 824. A diode 820 coupled in parallel with the resistor 822 and inductor 824. The cathode of diode 820 is coupled to the positive terminal of the voltage source 110. The anode of diode 820 is coupled to a second end of the inductor 824 forming a node of terminal A.

In addition, a second voltage source 886 having a positive terminal coupled to terminal A is coupled in series with switching device 830. In this embodiment, the ratio of the first and second voltage sources 110 and 886 is approximately 10:1. However, such a ratio is selected for illustration purposes only and other configurations may also be implemented. Also in this example, a transistor is used as an example of switching device 830 for the purposes of illustration only. Other types of switching devices may also be utilized. In this example, a negative terminal of second voltage source 886 is coupled to a collector of transistor 830 while an emitter of the transistor 830 is coupled to a negative terminal of the first voltage source 110, which is coupled to ground forming a terminal B.

According to one embodiment, during the time switch 830 is turned on, the voltage across terminals A and B will be approximately equal to the output of the second voltage source 886. In this example, the voltage across terminals A and B will be V/10 or ¹⁄₁₀ of output V of the first voltage source 110. Switch 830 may be turned on at any time when a power circuit (e.g., circuit 800 of FIG. 8) that requires a switching device (e.g., switching device 105 of FIG. 8) is coupled to the terminals A and B, similar to the configuration as shown in FIG. 8.

Referring to FIG. 8A, according to one embodiment, when switch 830 starts to turn on for a predetermined period of time at a constant rate (e.g., no load current across terminals A and B), the current in the inductor 824 will continue to ratchet up until the negative voltage-time integral across the inductor 824 (when switch 830 is off) is equal to the positive voltage-time integral across the same turns when switch 830 is on. An example of the basic waveform across terminals A and B is shown in FIG. 8F.

The current that will ratchet up may be determined by the size of resistor 822. The larger resistor 822 is, the lower the current will ratchet up to. By adjusting resistor 822, the current may be set to a value higher than, equal to, or below the maximum load current. Under certain conditions, according to certain embodiments, the current may be set to significantly below the maximum load current. In this configuration, the rating (e.g., the maximum load handled) of switch 830 may be significantly reduced. The current in switch 830 and resistor 822 may vary as the load current varies up and down and also when the load becomes regenerative in order to maintain the net volt-seconds on inductor 824 at zero.

Figure 8B:
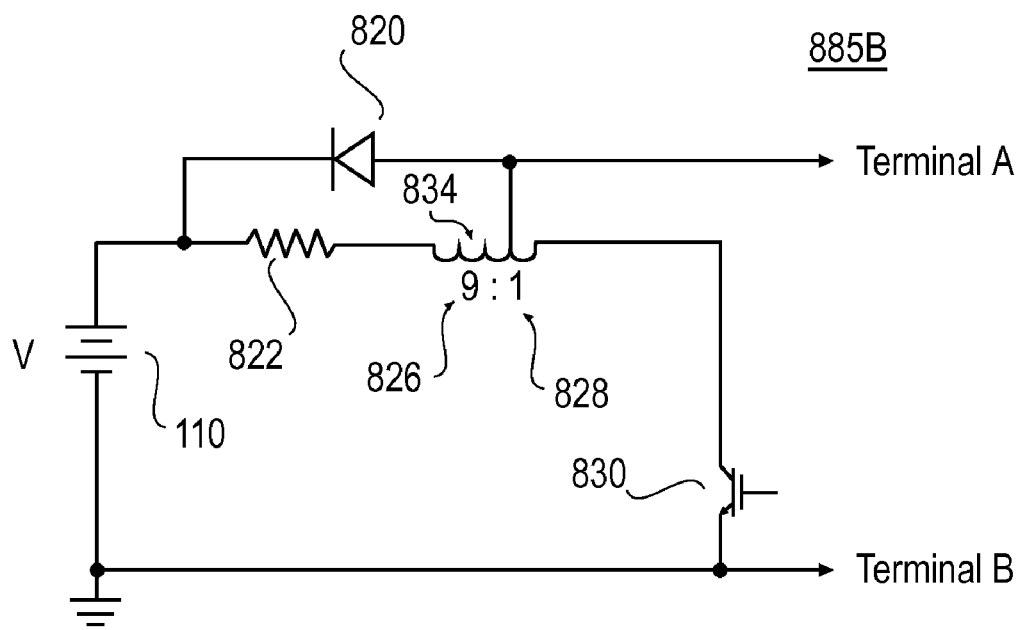

Referring now to FIG. 8B, according to an alternative embodiment, circuit 885B may be implemented in place of circuit 885 of FIG. 8. Circuit 885B operates similar to those of circuit 885A of FIG. 8A. In this embodiment, transformer (also referred to as an auto-former) 834 may be used in place of inductor 824 of FIG. 8A. A first terminal of transformer 834 is coupled to resistor 822 while a second terminal is coupled to a collector of transistor 830 (used as an example of a switching device). In addition, transformer 834 includes a third terminal between the first and second terminals forming a first turn 826 and a second turn 828. The third terminal is coupled to the anode of diode 820, forming the terminal A. In this example, the first turn 826 and the second turn 828 is 9:1; however, other turn ratios may be implemented.

Circuit 885B operates similar to circuit 885A of FIG. 8A, but obtains the V/10 voltage in a different way according to another embodiment. The current ratchets up and varies in the similar ways as FIG. 8A. The V/10 voltage is obtained by using transformer 834 instead of an inductor. When the turn ratio between 826 and 828 is approximately 9:1 for example, when switch 830 is turned on, the voltage across the terminals A and B (e.g., across the turn 828) will be approximately V/10.

Figure 8C:
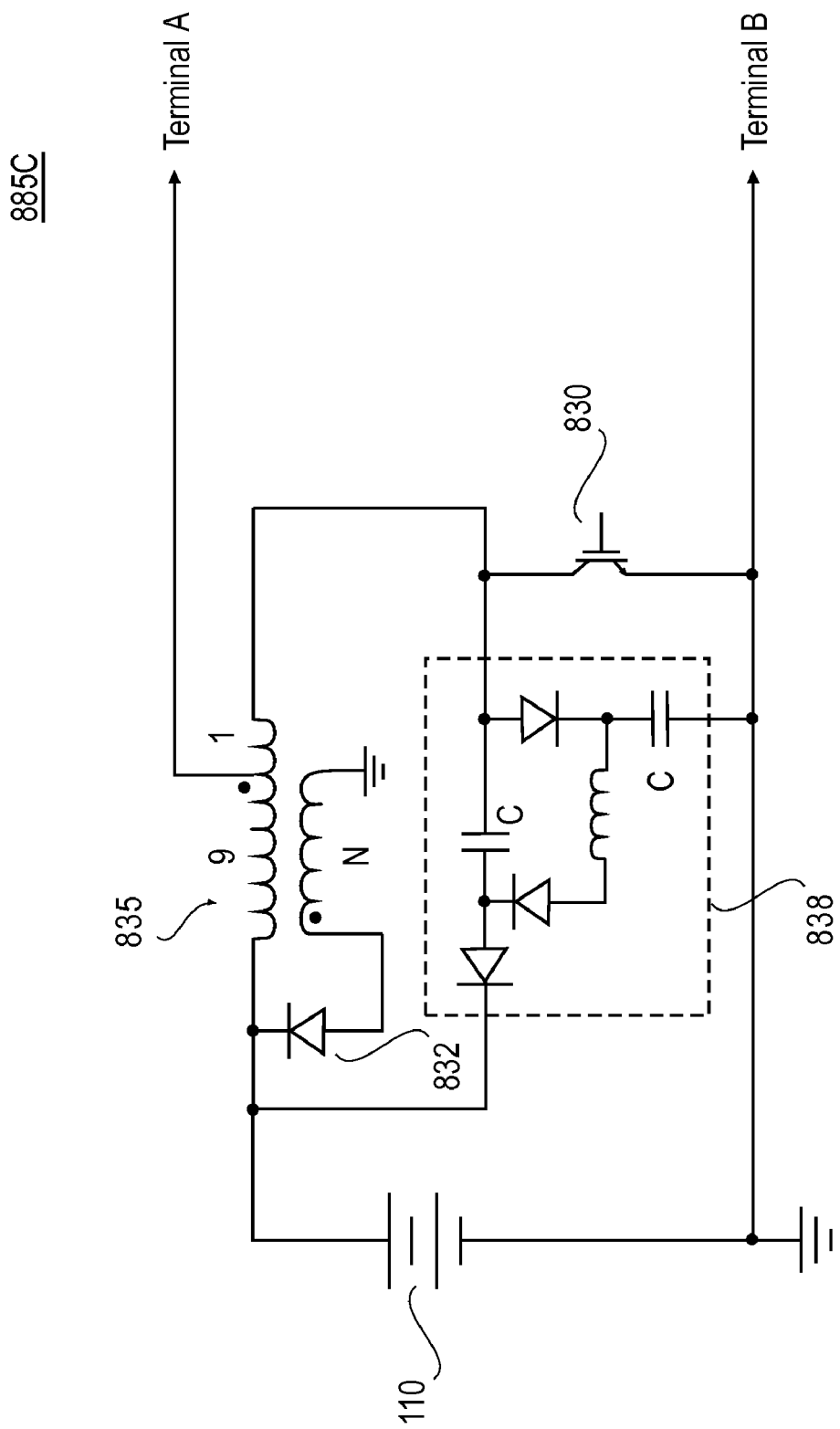

Referring now to FIG. 8C, according to an alternative embodiment, circuit 885C may be implemented in place of circuit 885 of FIG. 8. Circuit 885C operates similar to circuit 885B of FIG. 8B, but the energy that was lost in the resistor 822 of FIG. 8B is now fed back to the voltage source 110. The current in transformer 835 will ratchet up until the negative voltage-time integral, when switch 830 is turned off, is equal to the positive voltage-time integral across transformer when switch 830 is turned on. The mechanism that limits how high the current ratchets up to is different than when a resistor (e.g., resistor 822 of FIG. 8B) is used.

For a given turns ratio of the transformer, the size of the capacitors in lossless filter 838 will determine how high the current ratchets up to. Note that the specific configuration of the lossless filter 838 as shown is just an example. Other types and configurations of lossless filters may also be utilized. Typically, there are two parts of the positive volt-time integral. The first part is the time that switch 830 is held on. This does not vary much with current and is almost identical at most or all times. It is the second part that determines how high the current ratchets up to.

According to one embodiment, if the current is lower than designed for, the capacitors of the lossless filter 838 will change voltage slowly which in turn puts a higher value of positive volt-seconds on the transformer 835 and the current will ratchet up. If the current is too high, the capacitors of the lossless filter 838 will change voltage fast and this will in turn cause a lower value of positive volt-seconds and the current in the transformer will ratchet down. In either case, the current will change in the direction necessary until the net volt-seconds reaches approximately zero.

The negative volt-seconds are in turn determined by the turn ratio of the transformer 835 and the time it takes the capacitors of the lossless filter 838 to change voltage. If the current is too high then the capacitors will change voltage quickly and the fixed negative voltage of the transformer, determined by the turn ratio of the transformer 835, will be applied on the transformer 835 for a relatively longer time. This will cause the current to ratchet down.

When the current is too high there are less positive volt-seconds and more negative volt-seconds and the current will ratchet down. When the current is too low, there are more positive volt-seconds and less negative volt-seconds and the current will ratchet up. The current will do what in necessary to maintain the net volt-seconds approximately at zero.

Figure 8D:
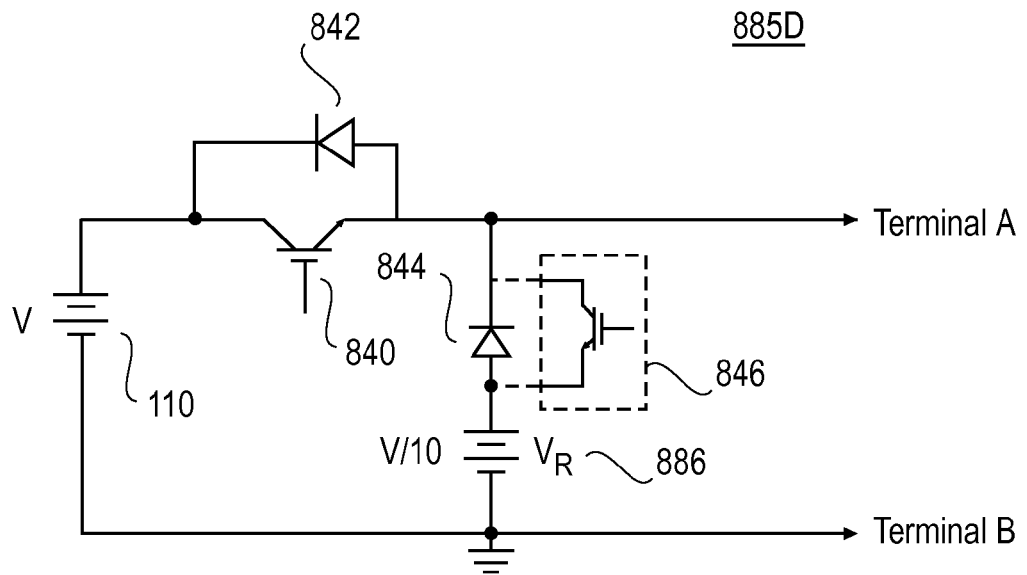
Figure 8E:
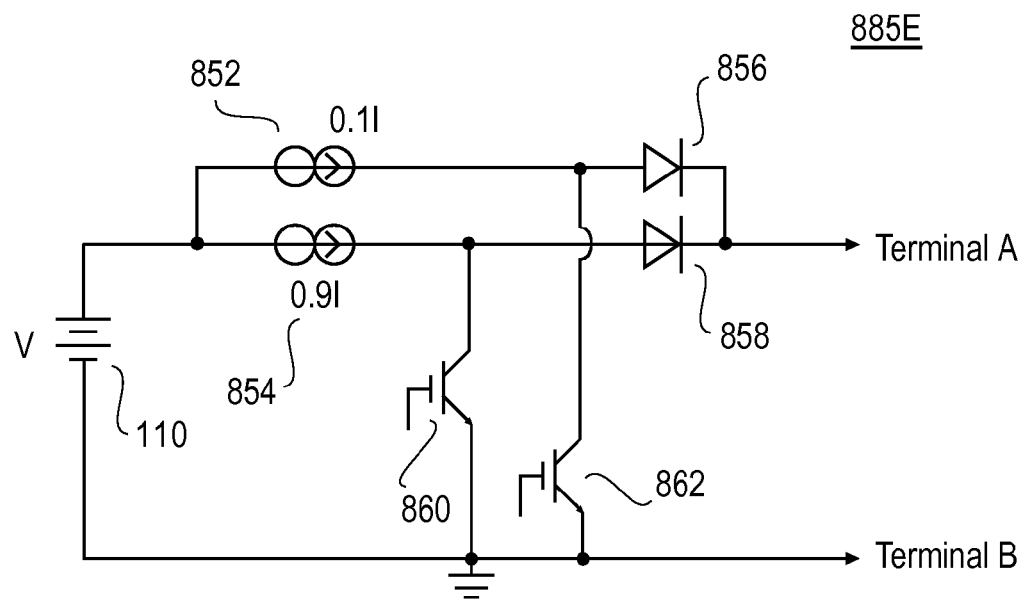
Figure 8F:
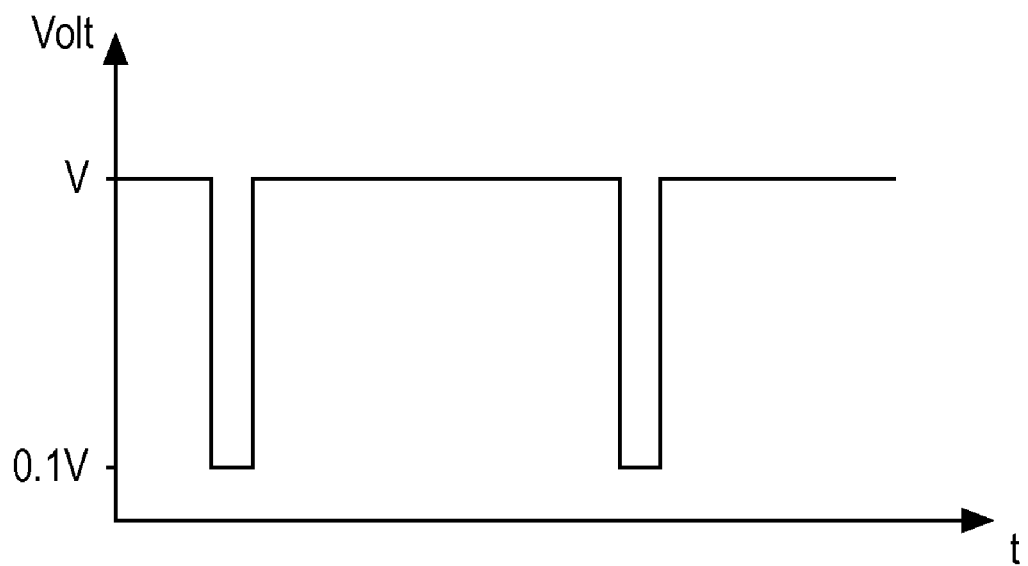
Figure 8I:
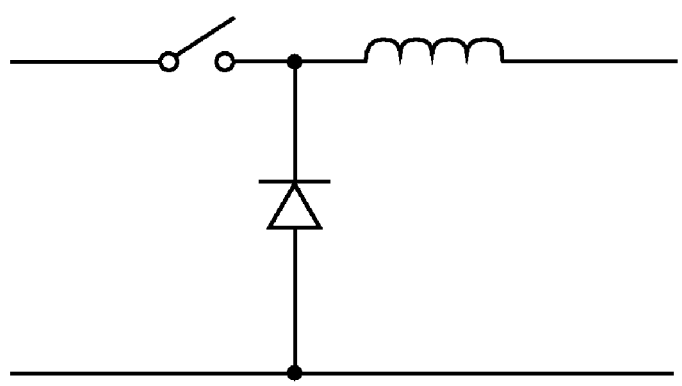
Figure 8G:
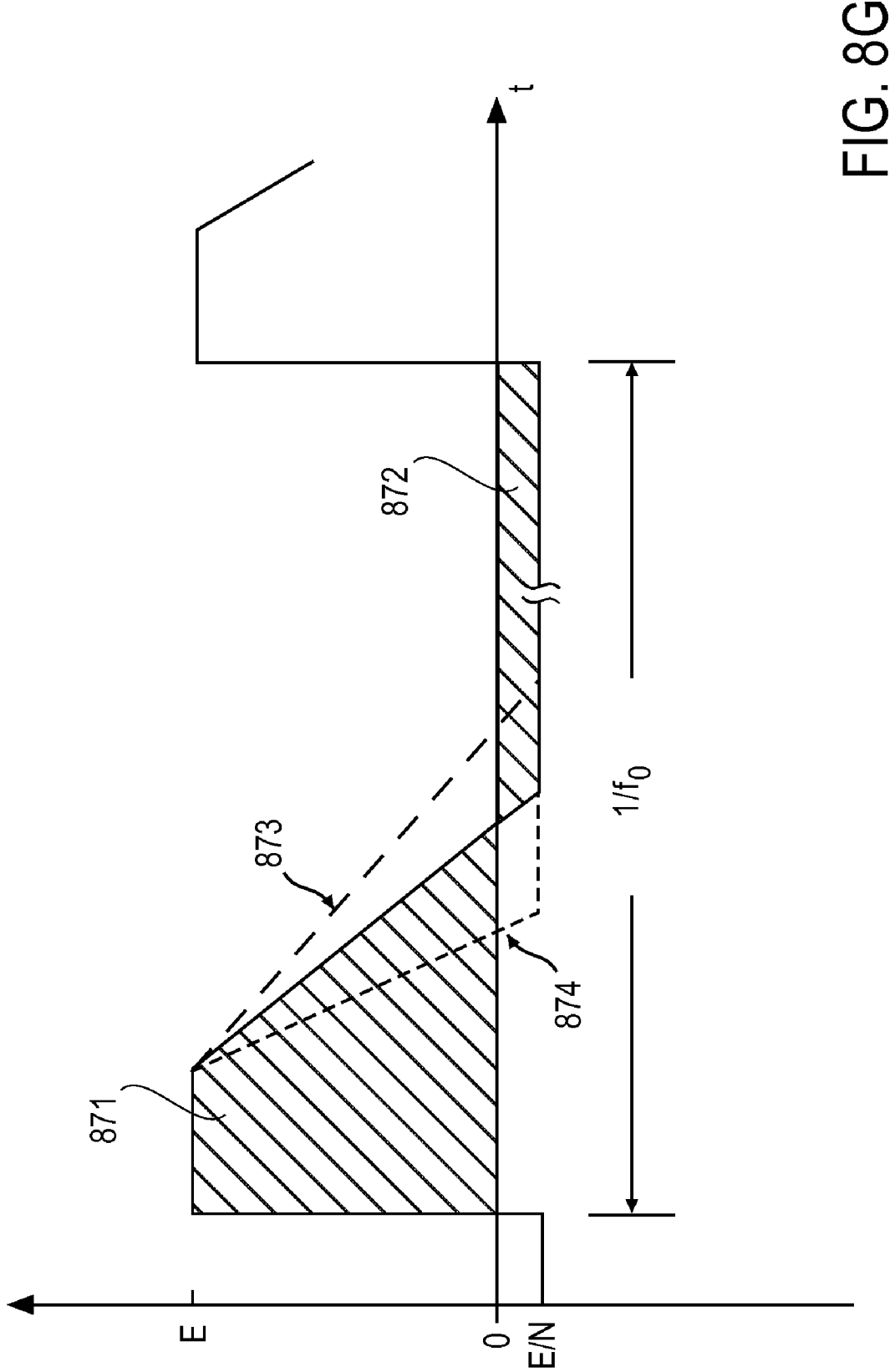

According to one embodiment, at least a portion of this process is shown in FIG. 8G. Referring to FIG. 8G, the voltage as shown is the voltage across the primary winding of the transformer (e.g., the 9:1 turn side of the transformer as shown in FIG. 8C). The hatched area 871 above zero volt is the positive volt-seconds and the hatched area 872 below zero volt is the negative volt-seconds. This is a typical waveform when the net volt-seconds are approximately zero (e.g., when the positive volt-second hatched area is equal to the negative volt-second hatched area).

The dotted line 873 represents the waveform if the current is too low. Note that with the current too low, there are more positive volt-seconds and less negative volt-seconds. The dotted line 874 represents the waveform in which the current is too high, where there are less positive volt-seconds and more negative volt-seconds.

In one embodiment, variable "N" may be approximately determined via a formula as shown in FIG. 8H. Note that variable "N" may also determined via other mechanisms. Referring to FIGS. 8C and 8H, for example, when switch 830 is turned on, the voltage across terminals A and B approximately equals to E/10. Note that again, such a ratio is used as an example with respect to FIGS. 8C and 8H for the purposes of illustrations only. It is assumed that the number of turns labeled "9" in transformer 835 of FIG. 8C is one. Further, variable "C" approximately represents at least one of the capacitors in the lossless filter 838. Variable "E" approximately represents the input DC voltage of voltage source 110. Variable "$f_o$" approximately represents the frequency at which the voltage between terminals A and B is reduced to E/10. Variable "$t_1$" approximately represents the time switch 830 is turned on. Variable "$I_0$" approximately represents the maximum load current that flows in switch 830 is turned off when a load is connected to terminals A and B (e.g., not conducting any current). Note that this can be significantly less than the maximum current that will flow in terminals A and B. Other configurations may exist.

Referring now to FIG. 8D, according to an alternative embodiment, circuit 885D may be implemented in place of circuit 885 of FIG. 8. Circuit 885D operates similar to circuits 885A-885C of FIGS. 8A-8C respectively, but without using a magnetic component. When a V/10 volt is required across terminals A and B, switch 840 may be turned off (by a control signal received at the base, not shown). When a full voltage is required across the terminals A and B, switch 840 may be turned on. Optionally, when a 4 quadrant operation is needed, switch 846 may be coupled in parallel with diode 844. Otherwise, if the load is going to generate power back to the Voltage Source 110, Switch 846 is required.

Referring now to FIG. 8E, according to one embodiment, circuit 885E may be implemented in place of circuit 885 of FIG. 8. Particularly, circuit 885E illustrates one version of a basic concept to reduce the switching losses in a current source system. In one embodiment, terminals A and B may be coupled to a 3-phase current sourced PWM system. The operations of circuit 885E are similar to those with respect to FIGS. 8A-8D, except now the current (rather than the voltage) is reduced to a low value when a switch connected to terminals A and B is turned on and/or off. This in turn reduces the switching losses in the current source system connected to terminals A and B.

Referring to FIG. 8E, in one embodiment, circuit 885E includes, but is not limited to, a DC voltage source 110 coupled to two current sources 852 and 854. The current sources 852 and 854 may be designed to relate to each other having a predetermined factor or ratio, such as, for example, a factor of 9:1. When switches 860 and 862 are turned off, the current sources 852 and 854 are summed together via diodes 856 and 858 at terminal A.

If a power switch (e.g., one of the switches in FIG. 9C) coupled to the terminals A and B is turned off, then both switches 860 and 862 are turned on. In this way, both of the current sources 852 and 854 are shunted to ground (e.g., terminal B). When a power switch coupled to the terminals A and B is turned off, there is no current in the power switch and therefore, the VI turn-off losses are reduced substantially, for example, approximately to zero.

Prior to the power switch coupled to the terminals A and B is to be turned off, both switches 860 and 862 will be turned on. When the power switch is to be turned on, switch 862 is turned off first and after a predetermined period of time, switch 860 is turned off. With only switch 862 turned off, the turn-on switching losses of the device coupled to terminals A and B will be relatively low and when switch 860 is turned off, the additional switching losses will be relatively small. Note that the VI losses and the CM losses in the power switch that was turned on is relatively low because, in this example, only 10% (determined in part by the relationship between two current sources 852 and 854) current flowed during the VI loss time and the CM time.

Note that the current sources 852 and 854 may be implemented using a variety of techniques, such as, for example, exemplary circuit shown in FIG. 8I. Further, it will be appreciated that FIGS. 8-8E show only the components that are necessary to achieve the conditions required at terminals A and B. Additional parts, which may have been described above, are not shown in order not to obscure embodiments of the invention.

In one embodiment, passive current limiting is inherent in FIGS. 8A-8C when a relatively short circuit is placed across terminals A and B. Otherwise, if a relatively short circuit appears across terminals A and B, the current in the relatively short circuit will rise quickly to the value of the current in the magnetic component and then the di/dt of the current will be limited by the size of the inductance of the magnetic component. This assumes that switch 830 in FIGS. 8A-8C is reverse blocking. If it is not reverse blocking, then a diode (not shown) may be additionally coupled in series with switch 830 at the collector. In one embodiment, as shown in FIGS. 8B and 8C, the autoformer/transformer may be used as a current limiting transformer to limit the current in a relatively short circuit between terminals A and B. Other configurations may also be applied.

Figure 9A:
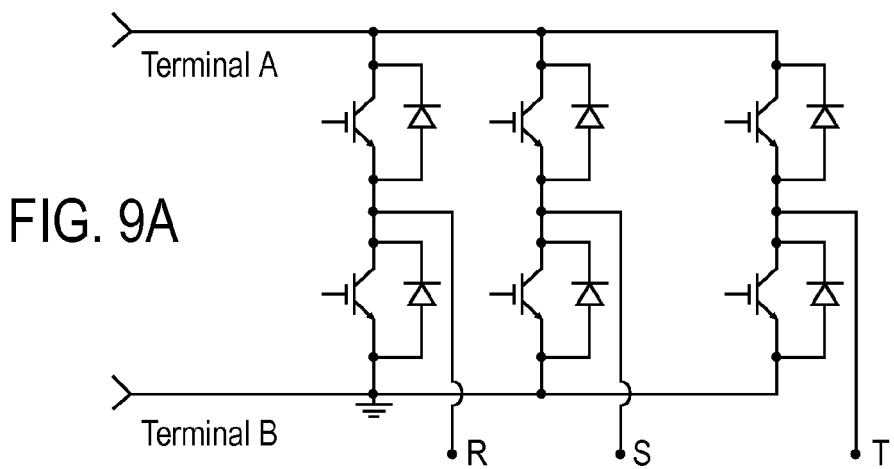
FIGS. 9A-9C are schematic diagrams illustrating various configurations of circuits for reducing power losses of a switching power converter according to other embodiments.
Figure 9B:
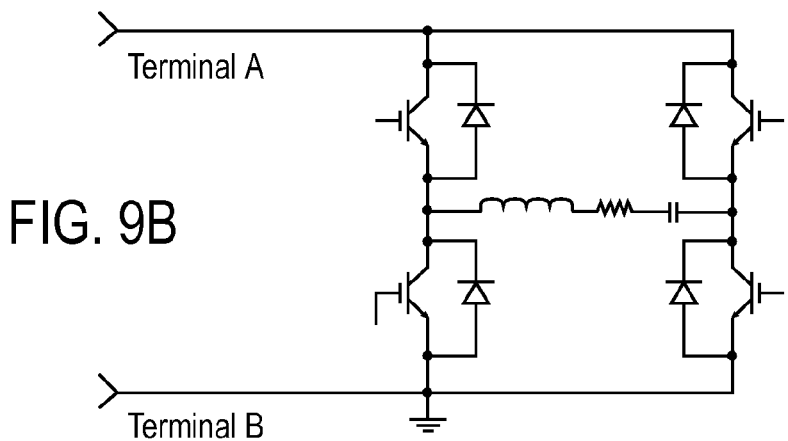
Figure 9C:
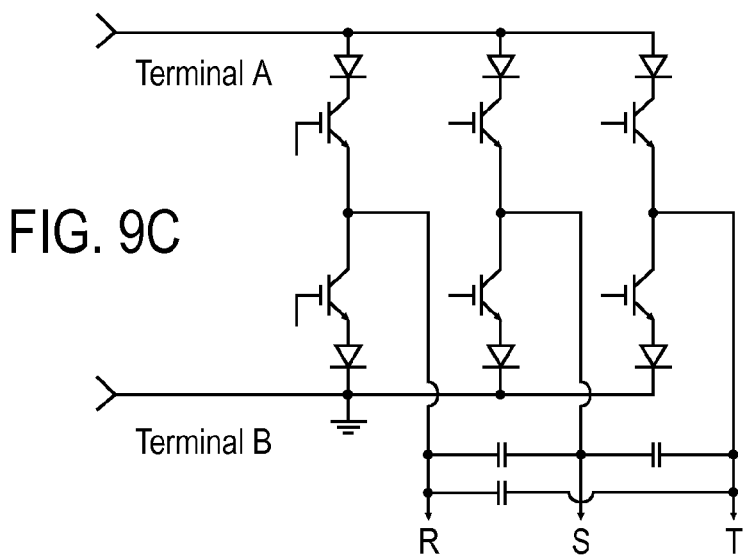

FIGS. 9A-9C are schematic diagrams illustrating various load configurations that may be used with one or more of the techniques described above according to certain embodiments of the invention. For example, FIGS. 9A and 9B are examples of two different kinds of loads that may be coupled to terminals A and B of any one of the circuit examples as shown in FIGS. 8A-8D.

Specifically, FIG. 9A is a typical 3-phase PWM type load. In one embodiment, if CM losses are an issue, a saturable reactor circuit may be coupled in series with each collector in the similar manner described in FIG. 6. FIG. 9B is a series resonant load, such as, for example, an induction heating load. Again, if the CM losses are an issue, a saturable reactor may be added to the load circuit.

FIG. 9C is a typical current source 3-phase PWM load that may be coupled to terminals A and B of FIG. 8E. Note that there is no current in the switches shown in FIG. 9C when the switches are turned off and as a result, the VI turn-off losses are reduced, for example, approximately to zero.

Note that the load circuit examples shown in FIGS. 9A-9C are described for the purposes of illustration only. It will be appreciated that other types of loads may also be implemented.

Embodiments of Soft-Switching Topologies

Figure 10:
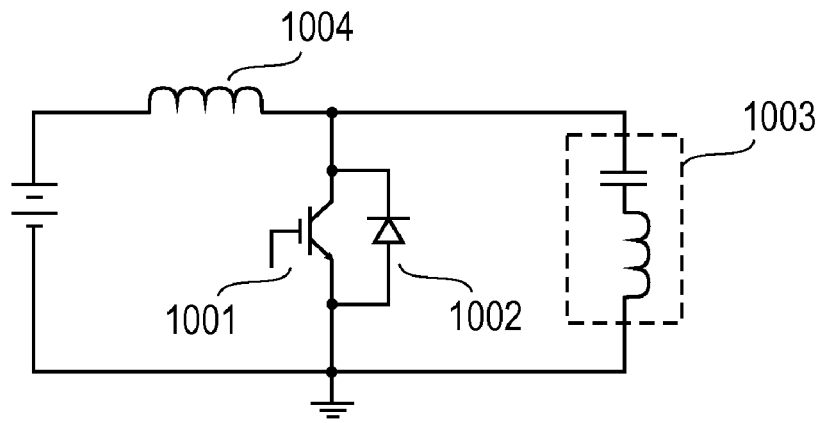
FIGS. 10, 10A, and 10B are diagrams illustrating a typical soft-switching topology.
Figure 10A:
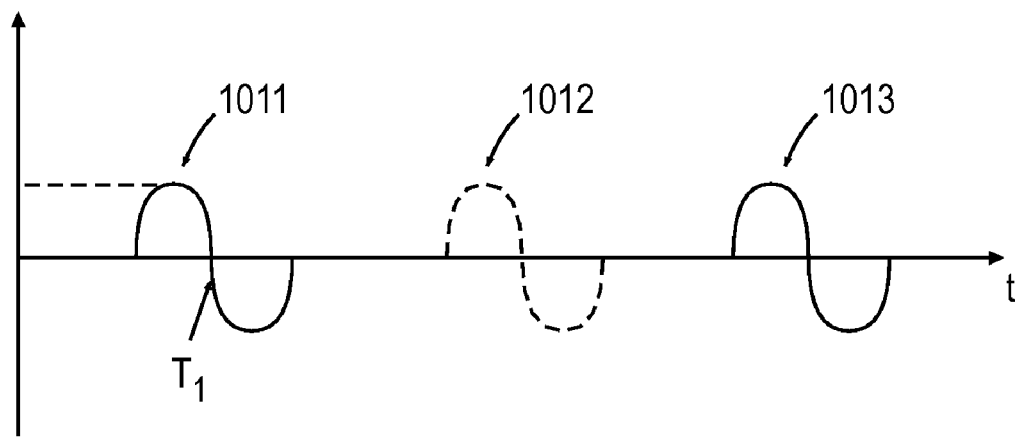
Figure 10B:
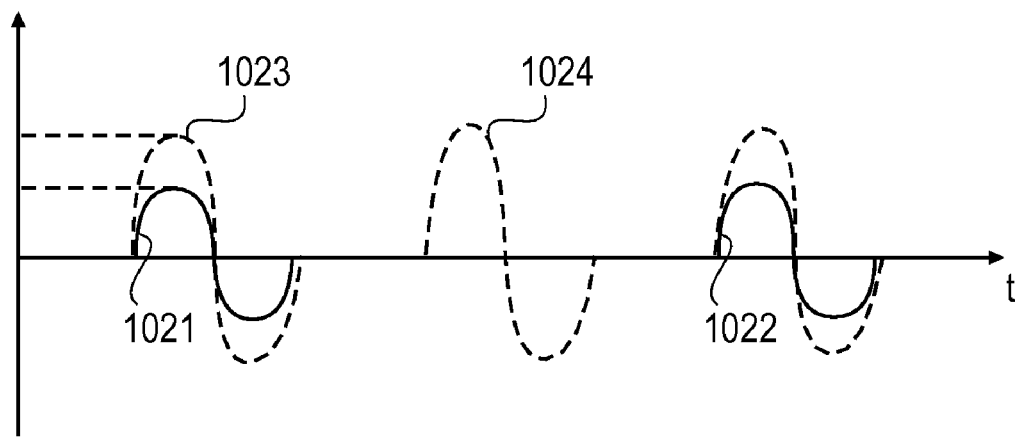

FIG. 10 is a schematic diagram illustrating a conventional circuit having a soft-switching topology. This circuit is also referred to as the Nevelle Mapham circuit (NMC) developed in 1970's and sometimes it is referred to as a ¼ bridge circuit. There are a variety of different versions of this circuit. Some versions may include multiple switching devices. The NMC circuit is one of many soft-switching circuits. This circuit virtually has no VI turn-off losses (e.g., when switch 1001 is turned off, there is virtually no current in switch 1001 and therefore there is no turn-off loss). FIGS. 10A and 10B are waveforms illustrating some operations of circuit as shown in FIG. 10.

Referring to FIGS. 10 and 10A-10B, when switch 1001 is turned on, an approximate sine wave current flows as shown in FIG. 10A. Switch 1001 is turned off shortly after the current reverses direction (e.g., time t1 as shown in FIG. 10A). The current shown in FIG. 10A is the current in series with the parallel combination of switch 1001 and diode 1002 in parallel with switch 1001. The positive half of the sine wave current flows through switch 1001 and the negative half flows through the diode 1002 that is in parallel with switch 1001. The power to the resonant load 1003 (represented by at least an inductor and a capacitor), which is coupled in parallel with switch 1001, is controlled by how often switch 1001 is turned on.

There are two modes of operations of the NMC circuit when increasing the power. The first mode is shown in FIG. 10A. Current waveforms 1011 and 1013 are shown when the circuit operates at a lower power level (e.g., lower switching frequency), while current waveforms 1011 and 1012 are shown when the circuit operates at a higher power level (e.g., higher switching frequency). As shown in FIG. 10A, the peak value of the sine wave does not increase as the switching frequency of switch 1001 increases, and therefore the power drawn by the load 1003 is increased.

The second mode is illustrated in FIG. 10B. In this example, waveforms 1021 and 1022 are shown when the circuit operates at a lower power level, while waveforms 1023 and 1024 are shown when the circuit operates at a higher power level. Note that as the switching frequency of switch 1001 increases, the waveforms not only come more often but also the magnitudes increase. The peak current will increase as the switching frequency increases, when the current in inductor 1004 of FIG. 10 becomes continuous.

While there is no VI turn-off losses (e.g., one possible benefit of soft-switching) in the circuit of FIG. 10, all the other switching losses are present. They include, for example, one or more of the follows.

1. Turn-off tail losses of switch 1001
2. VI turn-on losses of switch 1001
3. CM losses of switch 1001
4. Diode switching losses
5. Diode CM losses
6. ½ $CV^2$ losses of switch 1001

With a very simple low cost addition to the circuit as shown in FIG. 10, all or most of the first 5 losses listed above may be eliminated or significantly reduced.

Figure 10C:
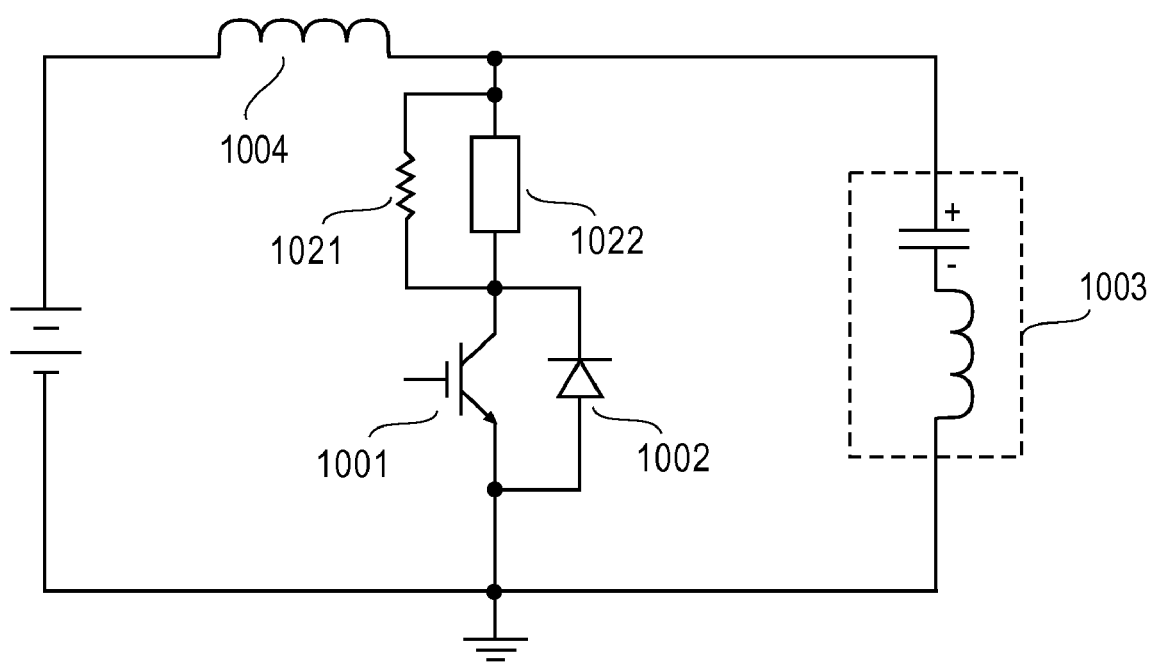

FIG. 10C is a schematic diagram illustrating an exemplary circuit with a soft-switching topology according to one embodiment of the invention. Referring to FIG. 10C, circuit 1020 operates in a manner similar to the circuit as shown in FIG. 10. Some components having substantially identical functionality are maintained with the same references. In this embodiment, in addition to those components shown in FIG. 10, resistor 1021 and saturable reactor 1022 are added and coupled in series with switch 1001.

With the added resistor 1021 and saturable reactor 1022, all or most of the significant switching losses of the circuit in FIG. 10 are eliminated or substantially reduced. The resistor 1021 and saturable reactor 1022 operate in a manner similar to those shown in FIG. 5. In one embodiment, resistor 1021 and saturable reactor 1022, or the similar type circuits, are used simultaneously in one circuit to reduce the VI turn-on losses and also to reduce all or most of other losses. Particularly, it is novel to use a combination of saturable reactor 1022 and resistor 1021 with a soft-switching topology (e.g., a soft-switching inverter) that gives the significant reduction in all or most of the switching losses.

Note that in various embodiments described herein, all or most of the major switching losses are significantly reduced substantially simultaneously either by the circuitry used or naturally with the inverter topology used. In some embodiments, even ½ $CV^2$ switching losses are significantly reduced.

FIGS. 10D-10G are timing diagrams illustrating various states of voltage and/or current of some components in FIG. 10C, according to certain embodiments. For example, FIG. 10D illustrates the current that flows through saturable reactor 1022 of FIG. 10C. A major difference between FIG. 10D and FIGS. 10A-10B is that there is a time delay between when the current returns to zero and the current goes negative (e.g., times $T_4$ and $T_5$ as shown in FIG. 10E).

FIG. 10E illustrates the voltage waveform across switch 1001 of Figure C. The description set forth below assumes that the saturable reactor 1022 is made, but is not required, of a square loop material and has a flux density of approximately zero at a time just prior to time $T_1$. At time $T_1$, switch 1001 is turned on. Until time $T_2$, there is no current in the saturable reactor 1022, assuming the coercive current of saturable reactor 1022 is approximately zero. During the time $T_1$ to $T_2$, current will flow through resistor 1021. The VI turn-on loss of switch 1001 is significantly reduced with the use of saturable reactor 1022 because the voltage across switch 1001 falls to approximately zero before significant current flows into switch 1001. As a result, this significantly reduces the number 2 switching losses listed above.

There still remain CM losses of the turn-on action to be overcome. By what is referred to as pre-conditioning of switch 1001, according to one embodiment, the CM losses may also be reduced. This is done by the use of resistor 1021. Before saturable reactor 1022 saturates positively, the current will flow in resistor 1021 in a similar manner described above with respect to FIG. 6. The magnitude of the current through the resistor and the time it takes the saturable reactor to saturate positively have to be coordinated in order to over come most or all of the CM losses. As a result, this significantly reduces the number 3 switching losses listed above.

In one embodiment, at time $T_2$, saturable reactor 1022 becomes saturated and the main sine wave current will begin to flow. At time $T_2$, the capacitor shown in the resonant load 1003 is charged in the polarity shown in FIG. 10C. At time $T_4$, the capacitor will have reversed its polarity to approximately the same magnitude as it was at time $T_2$. At time $T_4$, the current in the resonant load 1003 will try to reverse the direction. Little current will flow until the saturable reactor 1022 saturates negatively. During the time it takes saturable reactor 1022 to saturate, the current will again flow in resistor 1021 of FIG. 10C. This reverse current will flow through the diode 1002 in parallel with switch 1001 and overcome the CM losses in the diode 1002 in a similar way as of switch 1001. As a result, this significantly reduces the number 5 switching losses listed above.

In one embodiment, the reverse or negative sine wave current will then flow until it returns to zero at time $T_7$. At that time, the current will again try to flow positively. With saturable reactor 1022, there would then be tail current losses in switch 1001 (unless the resonant frequency of the resonant load 1003 was very low) and there would be the turn-off switching losses of the diode 1002 in parallel with switch 1001. With saturable reactor 1022 and resistor 1021, the switching losses numbers 1 and 4 listed above are significantly reduced.

Again, this is accomplished with the user of resistor 1021. Until switch 1001 and the diode in parallel start to block voltage, saturable reactor 1022 is again supporting the positive voltage across the capacitor of the resonant load 1003. Resistor 1021 will then again have current through it. This current will continue to flow until diode is swept out, the capacitance of switch 1001 is fully charged and tail current (if any) in switch 1001 has stopped flowing. It is preferred that the time necessary to accomplish three things to be approximately half the time it takes saturable reactor 1022 to saturate in the negative direction. In this way, there will be the correct time available for saturable reactor 1022 to again saturate, $T_1$ to $T_2$, when switch 1001 is again turned on.

In one embodiment, if there is a problem coordinating this time to get the action required during time T1 to T2 and the action required during T7 and T8, then many ways can be done to get the actions required. One is that saturable reactor 1022 can be reset during the time no sine wave current is flowing as described for the reset circuit 561 of FIG. 5. Another way is to use 2 resistors 1021 with diodes arranged such that negative saturable cycle the other resistor will have current in it.

Referring to FIGS. 10F and 10G, FIG. 10F illustrates the voltage from point B to ground in FIG. 10C with appropriate times marked. FIG. 10G illustrates the voltage across saturable reactor 1022 of FIG. 10C with appropriate times marked. In induction hearing applications, according to a specific embodiment, the effective heating frequency (using the times in FIG. 10E) may be determined as follows:

$$F_0 = 0.5/(T_6 - T_3)$$

Note that if the delay time $T_4$ to $T_5$ is relatively small compared to $T_2$ times the time between $T_2$ and $T_4$, then the effective heating frequency, when used in an induction heating application, is nearly equal to the natural resonant frequency of the resonant load (e.g., load 1003).

In summary, according to certain embodiments, with the soft-switching circuit as shown in FIG. 10C, which has naturally no or less VI turn-off switching losses, all or most of the remaining switching losses may be significantly reduced using a relatively low cost saturable reactor 1022 and resistor 1021. This enables a designer to run existing IGBT's (and other devices) at frequency 10 to 100 times higher than the conventional usages. This allows an inverter designer to replace 100's of FET's with just 1 IGBT. The cost reduction and reliability increase significantly using some or all of the techniques described above.

Embodiments of Modulation Schemes

Another way to get switching losses down in 3-phase PWM applications, according to certain embodiments, is to develop a modulation scheme, where the device that is carrying the most current in a multi-switch system similar to the one shown in FIG. 9A is not switched at all (e.g., it is just left on and never turned off during a carrier cycle). In this way, one can significantly reduce the switching losses without added hardware (e.g., with just a change in the logic). Similarly, a modulation scheme can be made where the switching device that is carrying the most current is not switched during a carrier cycle, then the overall switching losses may be reduced by approximately 50% (e.g., diode switching losses are reduced approximately 75 to 85%).

Note that when reducing the rail voltage to approximately 10% of the normal rail voltage in 3-phase PWM applications, the switching loss reduction can be achieved in the order of 90%. If the modulation scheme reference above is utilized in conjunction with the rail reduction approach, approximately 95% reduction in switching loss may be accomplished.

In one embodiment, a dwell switching approach with volt-second control is utilized. In a particular embodiment, the dwell switching approach requires that all 3 legs of a 3-phase inverter be connected to either the positive or negative DC rails at the end of each carrier cycle and kept there until the volt-second control commands the next carrier cycle to begin.

In one embodiment, which rail (+ or −) the 3 phases are connected to at the end of each carrier cycle is determined by which of the two legs the volt-second circuit controls first at the beginning of the next carrier cycle that has the most current. This is done regardless of the direction of power flow (e.g., in a motor control), whether regenerating is being monitored. There are some conditions where the third leg can be the controlling leg to determine which rail the three legs are connected to at the end of a carrier cycle.

In this way, the phase with the most current will not have to be switched during the next carrier cycle and therefore will have no or low switching losses. This could go on for many carrier cycles, for example, during the peak of a current sine wave (e.g., from 60 to 120 degrees) when the current in phase-A is in phase with voltage $V_{AB}$. Note this is when the switching losses are typically the highest. This concept also works with asymmetrical loads.

Figure 11:
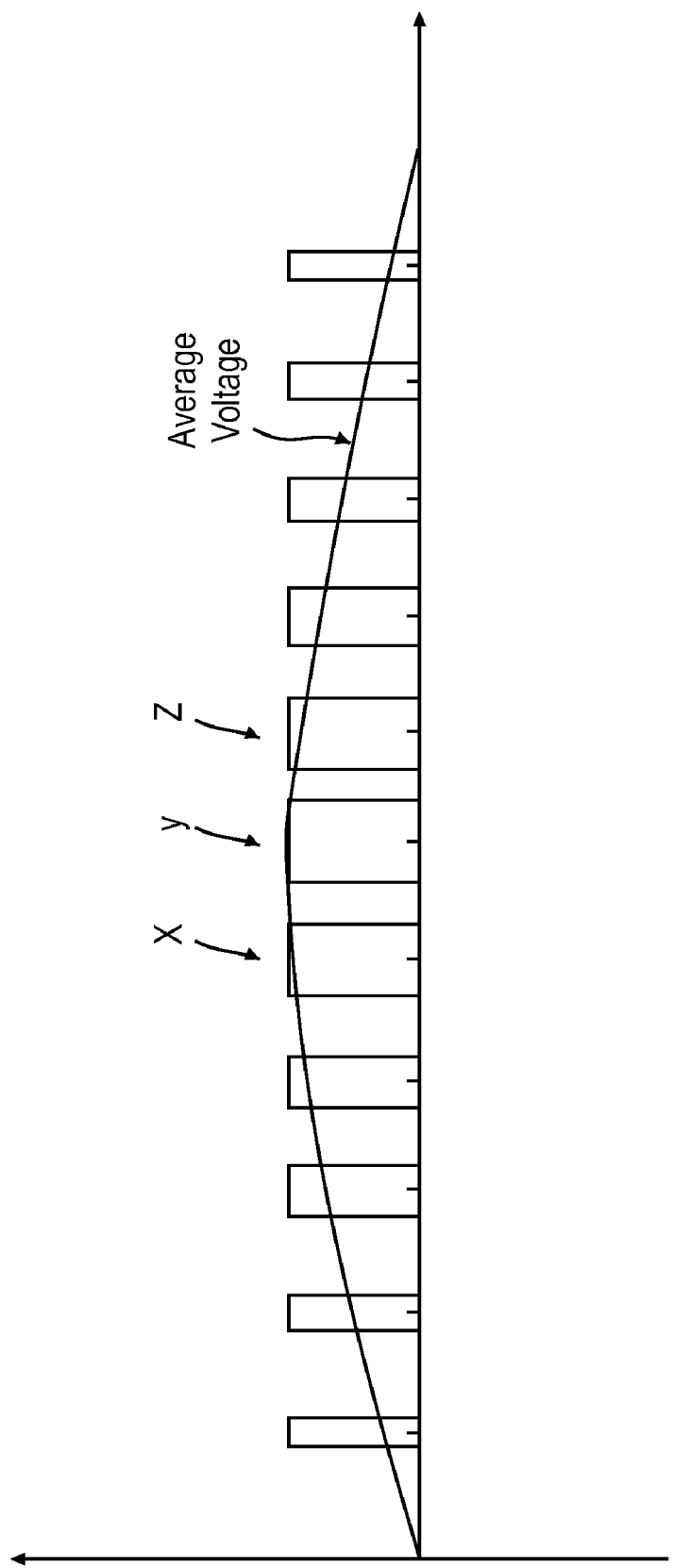
FIGS. 11 and 11A are diagrams illustrating an exemplary modulation scheme according to one embodiment of the invention.

The volt-second control will be described with respect to FIGS. 11 and 11A. FIG. 11 is a schematic diagram illustrating a typical PWM waveform between 2 legs of a 3-phase inverter (e.g. between legs R and S FIG. 9A) using a dwell type switching approach, according to one embodiment. Note that there are many other modulation schemes that may be applied. They can have multi-levels in the waveform and/or the waveform can go both positive and negative to name just a three. In FIG. 11, the voltages, using the dwell approach, only go to one level and then back to zero volts (e.g., never both positive and negative in the same carrier cycle).

Figure 11A:
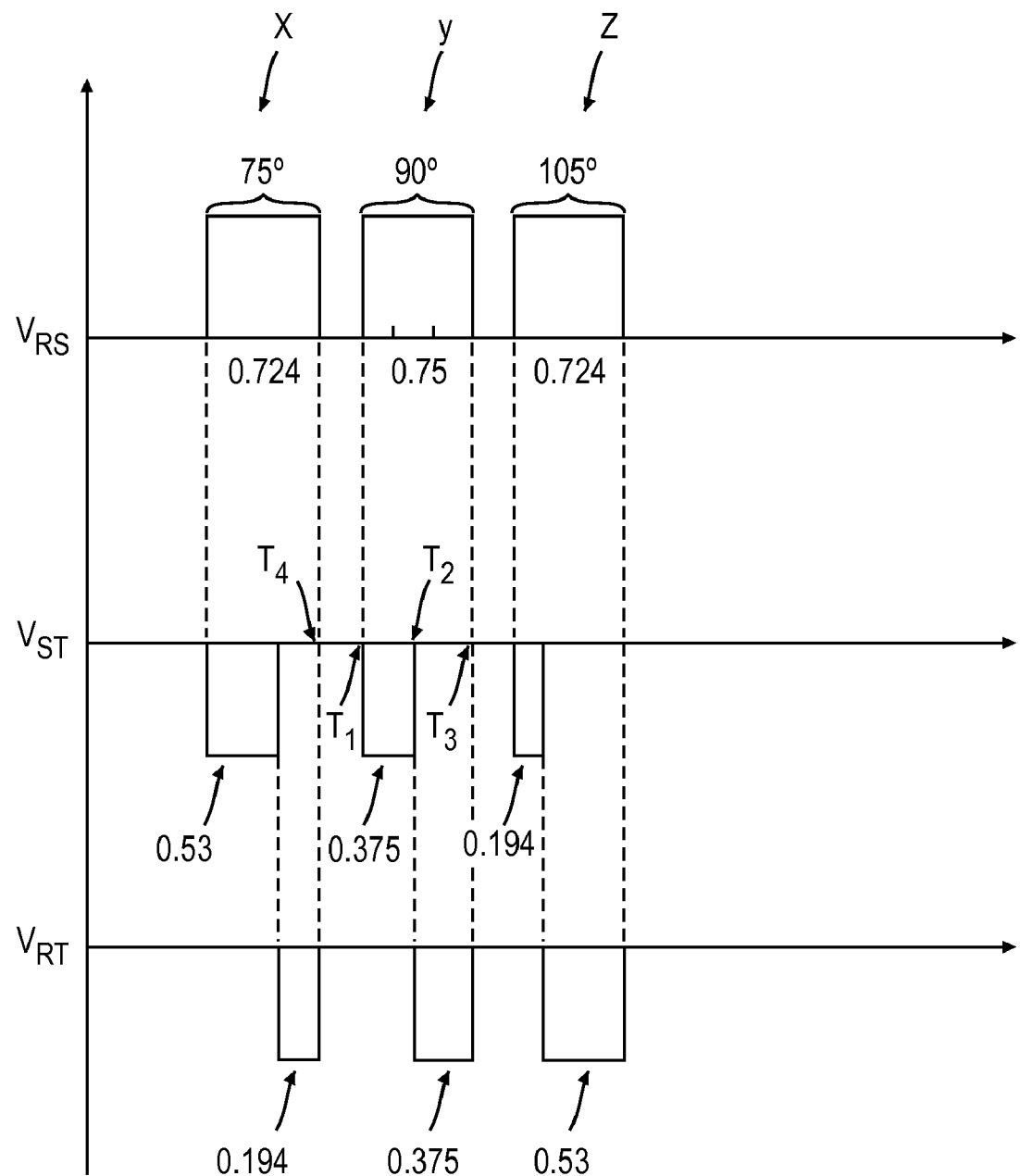

FIG. 11A depicts the 3 PWM waveforms that would be seen in a circuit similar to the one shown in FIG. 9A (e.g. from phase R to S, phase S to T and phase T to R) for 3 carrier cycles (e.g. cycles X, Y and Z FIG. 9A, which is one carrier cycle each side of the maximum pulse for a total of three pulses). It is assumed that the peak voltage is 75% of maximum voltage and again with the carrier frequency 24×'s the generated frequency as in FIG. 11.

It should be noted that the sum of the 3 voltages in a 3-phase system is approximately zero. This is also true for the sum of the 3 volt-seconds during any carrier cycle. The volt-seconds positive ($V_{RS}$) in FIG. 11A at 75° (0.724) equals the sum of the 2 negative volt-seconds (0.53+0.194). When one phase is at its peak voltage, the other phases are each at a half voltage and in an opposite polarity. Again the net volt-seconds are approximately zero. This is shown in FIG. 11A middle PWM waveform. For example, the volt-seconds positive (0.75) equals the sum of the volt-seconds negative (0.375+0.375).

It is this fact that makes the volt-second control in conjunction with the dwell switching approach work while just requiring the rail voltage to be reduce to 10% only 3 times per carrier cycle. The 3 times the rail voltage has to be reduced to approximately 10% is times $T_1$, $T_2$ and $T_3$ as shown in the voltage waveform for $V_{ST}$ in FIG. 11A. Other modulation schemes would require the rail voltage to go negative as many as 6 times per carrier cycle.

Referring to FIGS. 9A, 11, and 11A, at the end of a carrier cycle, $T_4$ FIG. 11A, either all the top switching devices (e.g., those connected to terminal A of FIG. 9A) or all the bottom switching devices (e.g., those connected to terminal B of FIG. 9A) are turned on. In this way, the voltages across all three phases are approximately zero during time $T_4$ to $T_1$ FIG. 11A. This is also known as the dwell time.

The volt-second control logic keeps these three devices turned on until it detects that the phase that is at the highest voltage has to be turned on in order for the volt-seconds required for that phase to be correct by the end of the carrier cycle. In FIG. 11A, this is the R-S phase.

At this time, if all the top switching devices were turned on, the bottom S phase switching device is turned on and will be left turned on until the end of the carrier cycle. Note that under these conditions, the top R phase switching device was turned on at the beginning of the carrier cycle and will be left turned on until at least to the end of the carrier cycle (e.g., there is no switching loss in the top R phase switching device during the carrier cycle). Note also that there is no switching losses in the bottom R phase switching device. If all the bottom devices were on the process would be reversed but the voltage waveform $V_{RS}$ would be the substantially the same (e.g., it does not make any difference from a PWM standpoint if all the top or bottom switching devices are turned on at the end of a carrier cycle). FIG. 11A assumes all the top switching devices were turned on.

At time $T_2$, the volt-second logic determines whether the volt-seconds to the ST phase are correct. At this time, the bottom switching device phase T is turned on until the end of the carrier cycle. Because the net volt-seconds to all 3 phases have to be zero, there will be automatically the correct volt-seconds applied to TC phase. At the end of the carrier cycle, time $T_3$, all three phases are again connected to either bottom or top rails (e.g., either all to terminal A or terminal B). This competes one carrier cycle.

Note that a voltage feed forward control may be used in the volt-seconds circuit to eliminate or reduce the DC buss ripple in the envelope of the generated waveform. In this way the exact volt-seconds required on a pulse may be obtained by pulse basis. This in turn enables the cost of the DC rail filter to be significantly reduced because the DC ripple voltage will not appear in the output waveform envelope.

One of the advantages of the control is that it gives approximately 15.5% more voltage available line-to-line in a 3-phase system than other conventional systems. This in turn gives approximately 15.5% more power out of existing inverters for just a low cost logic change. Other conventional systems can give the 15.5%, and sometimes more, but in doing so they generate significant harmonics, i.e. $5^{th}$, $7^{th}$, $11^{th}$ and so forth harmonics.

Also included in this application is a second completely different way of getting approximately 15.5% extra voltage that also can be adapted to significantly reduce switching losses with a different dwell type switching approach. The second system requires the rail to be reduced to approximately 10% more often than the first and therefore the first system is preferred when using the 10% rail approach.

To significantly reduce the switching losses, according to one embodiment, according to certain embodiments, it needs to connect the phase that has the most current in it (independent of the polarity of the current), at the end of the carrier cycle, to the rail it will be at during the non-dwell time of the carrier cycle. In general, the phase with the most current will be the phase with the highest voltage. If the phase with the highest voltage is positive, in one embodiment, one would connect all 3 phases to the positive rail at the end of the carrier cycle. If the phase with the highest voltage has a negative voltage, in one embodiment, one would connect all 3 phases to the negative rail at the end of the carrier cycle.

To optimize the switching loss reduction, it may have to take into account the power factor range the load will work at and if the load is regenerative or not. Under most conditions, the maximum current will be in one of the 2 legs that that are included in maximum voltage phase. For example, if the maximum voltage is in the RS phase, then the maximum current will be in either the R leg or the S leg. If the maximum voltage in the RS phase is positive, and the maximum current is in the R leg, then one would connect all 3 phases to the positive rail. If the maximum current was in the S leg, then one would connect all 3 phases to the negative rail at the end of the carrier cycle. In this way, the switching devices in the leg with the most current will have no or low switching losses during the next carrier cycle. The switching loss reduction is in the order of 50% just with a change in the logic regardless if the 10% approach is used or not. If the 10% rail approach is not even used, this is a significant reduction in switching loss in its own right. This in turn would allow a designer to significantly increase the power and/or frequency of existing inverters which of course would have significant value.

Another modulation method, called the third harmonic method, can be used to reduce switching losses with just a logic change. This method also gets approximately 15.5% increase in voltage line-to-line which in itself is of significant value. Most, if not all, modulation schemes independently control the voltage of each leg of a 3-phase inverter. In sine wave applications, when at maximum output voltage, the voltage at the R, S and T points of FIG. 9A will be controlled to vary from being at essentially the voltage at the terminal B and in a sinusoidal manner will be increased to the voltage of terminal A and again in a sinusoidal manner return to negative rail (terminal B). This process continues as long as the maximum output voltage is required.

Figure 12:
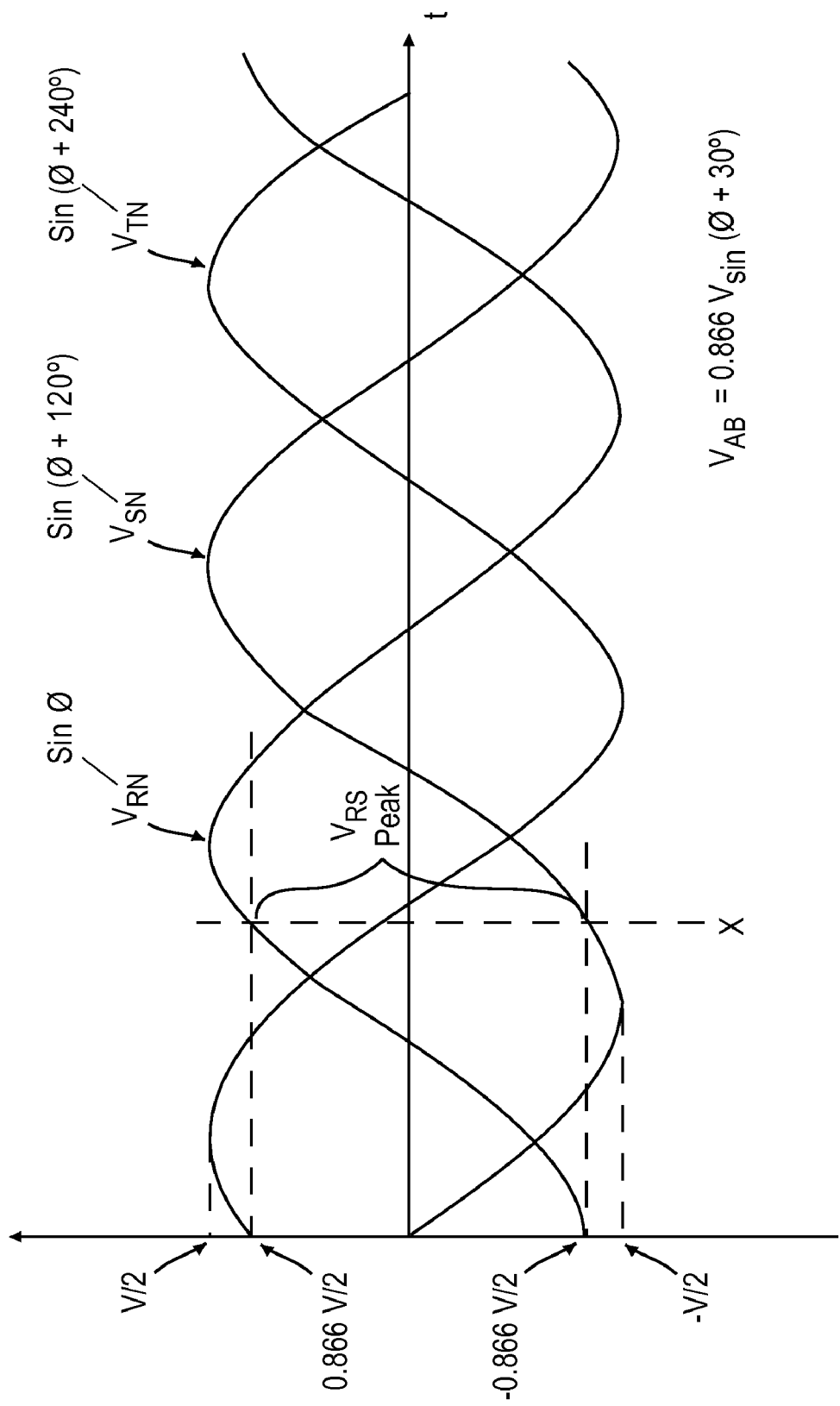
FIGS. 12 and 12A-12C are diagrams illustrating an exemplary modulation scheme according to another embodiment of the invention.

This is shown graphically in FIG. 12. The 3 voltages shown are the line-to-neutral voltages of a 3-phase sinusoidal system, where the voltage between the R terminal and the center of the DC voltage is called $V_{RN}$. Similarly, the voltages $V_{SN}$ and $V_{TN}$ are shown phase shifted 120° and 240° respectively. The peak voltage between 2 legs is shown in FIG. 12 at time X and is labeled $V_{RS}$ peak.

When using this method, the maximum voltage line-to-line is 0.866 of the DC input voltage. The voltage line-to-line is the voltage difference between any 2 of the 3 phase voltages shown. For example, the voltage between the R and S legs would be:

$$V_{RS} = V_{RN} - V_{SN}$$

Numerically $V_{RS} = 0.866 * V * \mathrm{Sin}(A+30°)$ where A is the angle of $V_{RN}$.

The following shows a way to get the voltage $V_{RS}$ to $V*\mathrm{Sin}(A+30°)$ which is 15.47% more voltage than above. Note that this means that in all existing inverters, power can be increased 15.47% with just the low cost of a logic change. The dwell method described above also gets the same 15.47% increase in voltage.

Figure 12A:
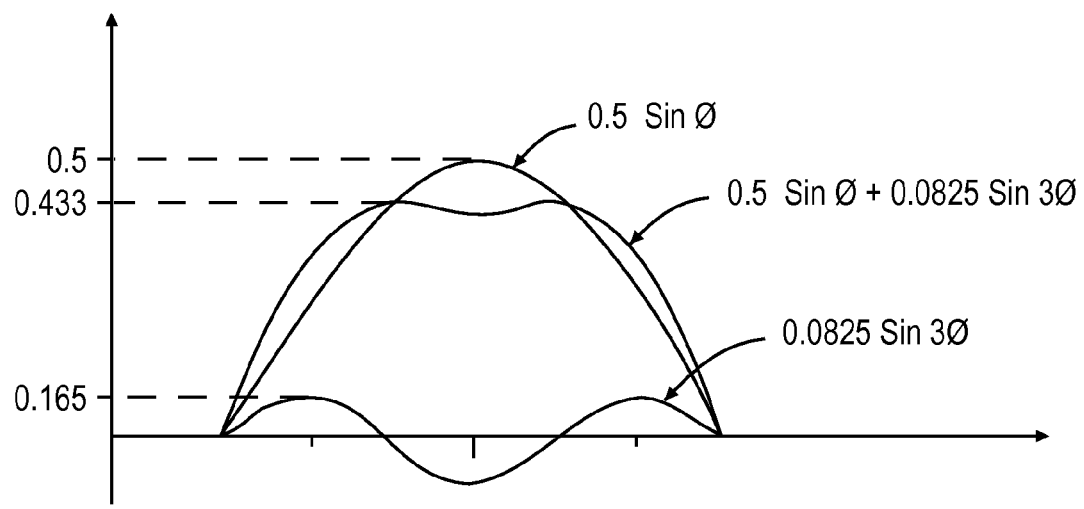

Shown in FIG. 12A is a sine wave whose peak voltage is shown as 0.5. The 0.5 represents half of the DC buss voltage. Similarly, with respect to the neutral point, the peak voltage of the sine wave is 0.5 times the DC buss voltage. This is the maximum voltage can be obtained line-to-neutral without distorting the waveform. For example, if the sine way was any higher, the sine wave would be flat on top and would contain harmonics.

Also in FIG. 12A is shown a sinusoidal voltage waveform of magnitude 0.0825 of the DC buss voltage at 3 times the frequency of the sine wave of magnitude 0.5. If you add these 2 waveforms together you get the $3^{rd}$ waveform shown in FIG. 12A. The equation for the $3^{rd}$ waveform is:

$$0.5*\mathrm{Sin}(A)+0.0825*\mathrm{Sin}(3*A)$$

Note that the third waveform only has a peak voltage of 86.6% (e.g., 0.433) of the waveform first described. Also note that if the third waveform was used 3 times instead of the 3 sinusoidal waveforms shown in FIG. 12, one would get exactly the same peak voltage line-to-line as if the third harmonic were not in the waveform (e.g., there would be no $3^{rd}$ harmonic in the line-to-line voltage). This is because in 3-phase systems it is impossible to get $3^{rd}$ harmonic in the line-to-line voltage when it is present in the line-to-neutral voltage.

Figure 12B:
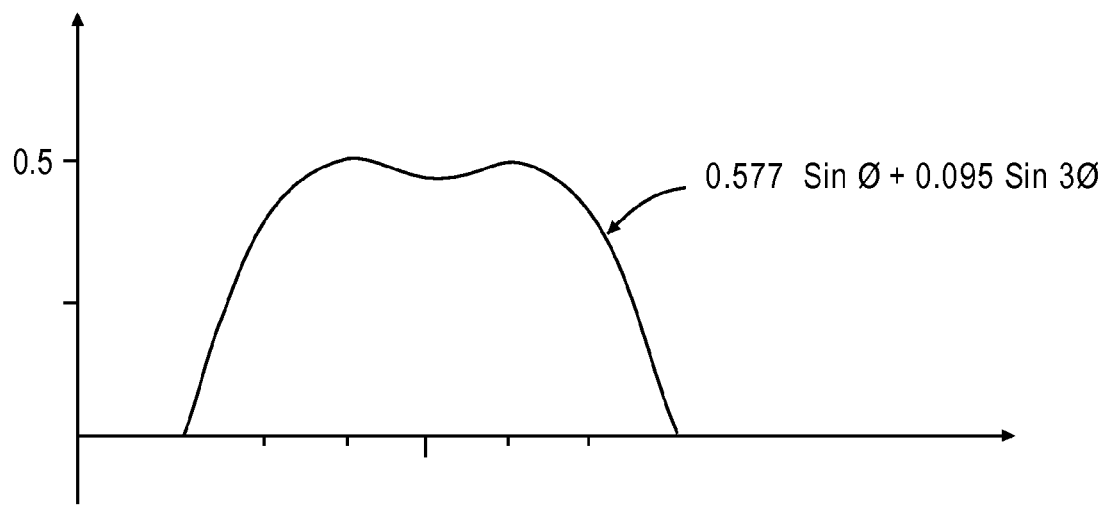

Noting that the peak voltage of the $3^{rd}$ waveform is not at the maximum voltage possible that can be used without distortion, it can be increased in value by a factor of 1.1547 (e.g., 1/0.866). This waveform is shown in FIG. 12B. Since the waveform in FIG. 12B does not go above 0.5, it is not distorted but contains 15.47% more fundamental than the sine wave voltages shown in FIG. 12 the voltage line-to-line will contain 15.47% more voltage without any third harmonic.

Figure 12C:
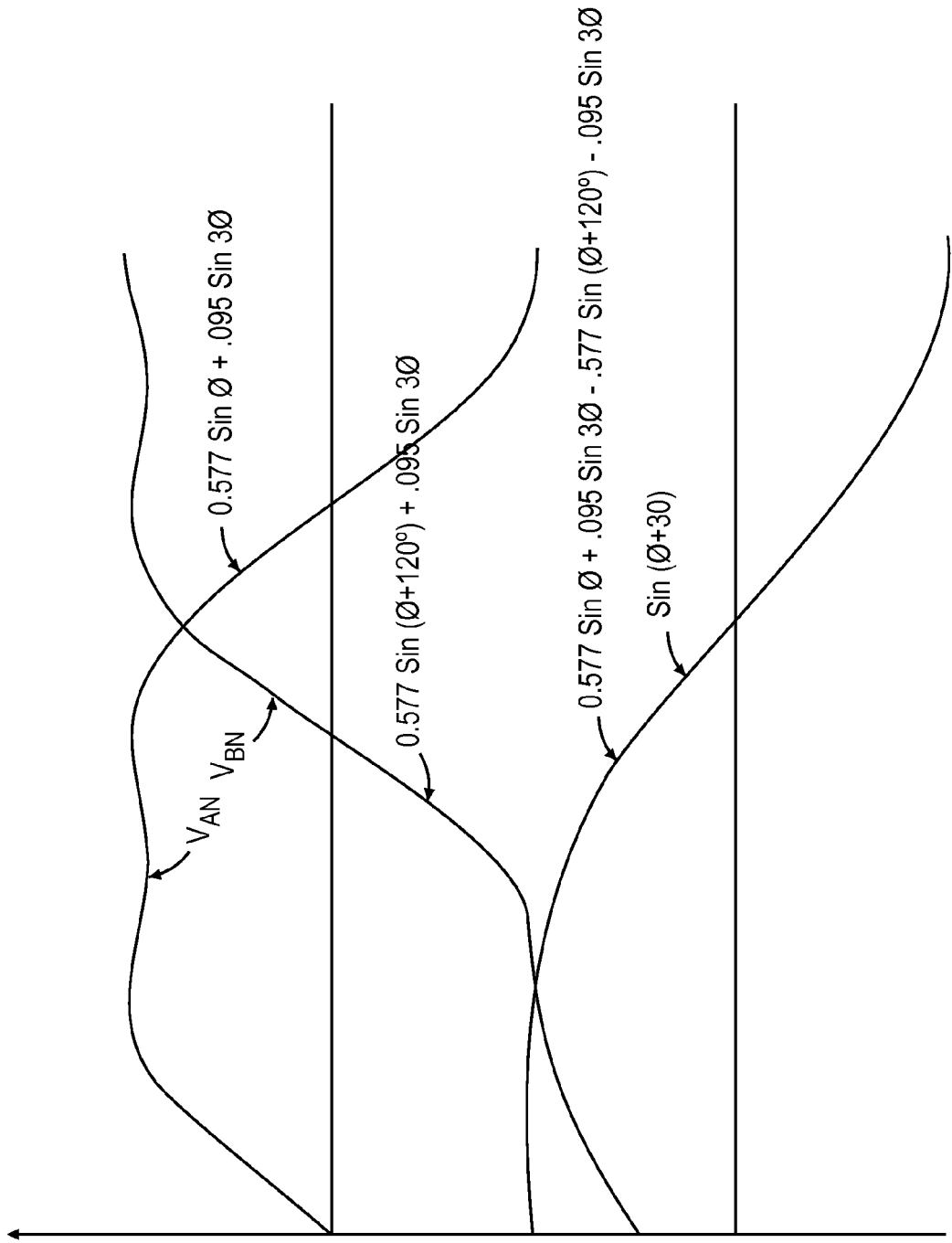

In FIG. 12C is a graphic representation of using waveforms like that shown in FIG. 12B for the 3 sine waves shown in FIG. 12. Note that the peak voltage of the sine wave is 1 and does not contain any $3^{rd}$ harmonic.

Operations of Lossless Filters

Figure 13:
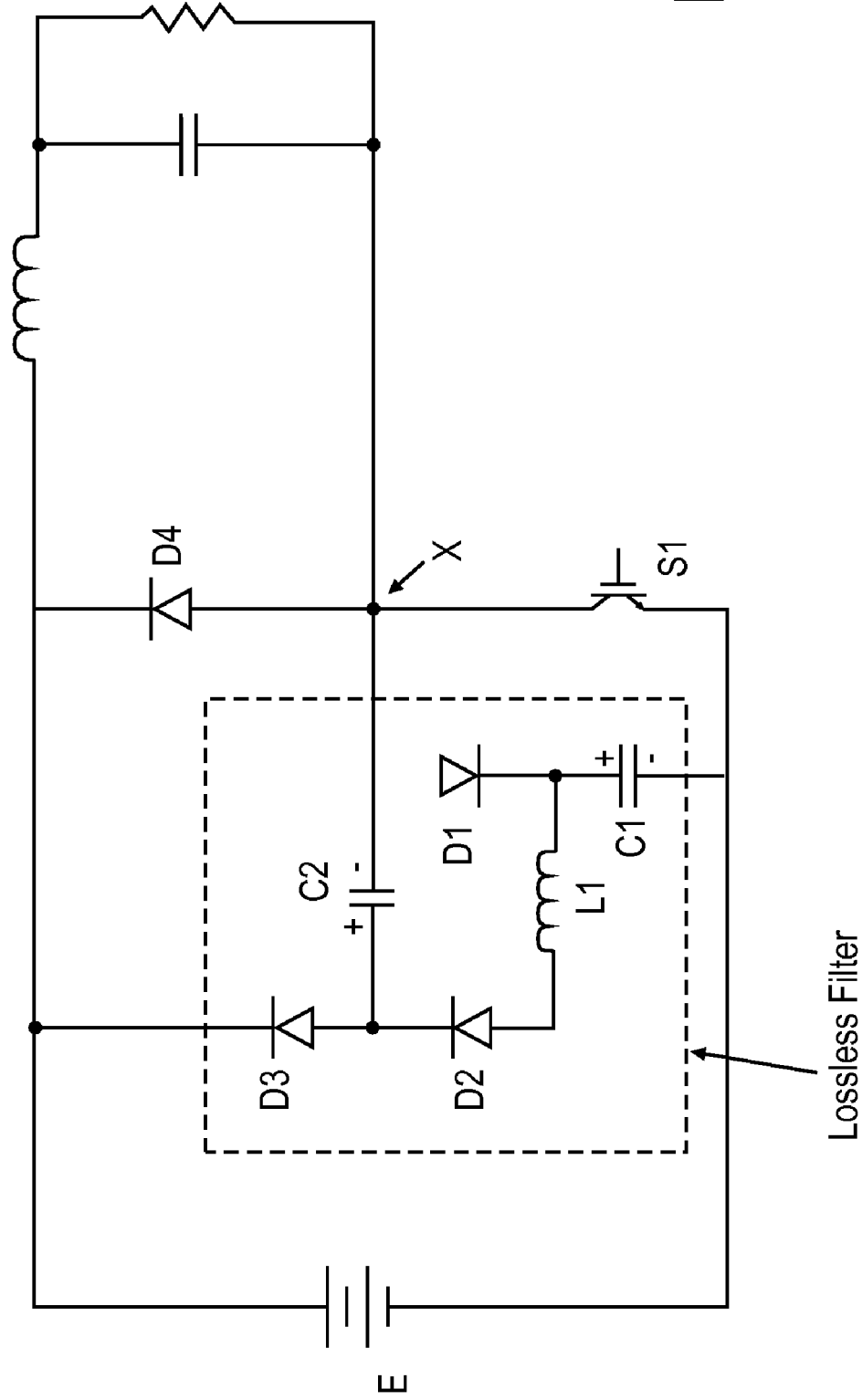
FIG. 13 is a schematic diagram illustrating an exemplary lossless filter.

A lossless filter has been referenced several times in this application. There are many different filter circuits that are lossless. This is just one example of them. FIG. 13 is a schematic diagram illustrating a typical lossless filter. In this example as shown in FIG. 13, the lossless filter (represented by a dotted line area) operates in a manner similar to the lossless filter 838 of FIG. 8C. Shown in FIG. 13 is a standard DC/DC chopper. Where switch S1 is turned on and off at a fixed frequency and variable pulse width to control the output voltage. The following description is of 1 full cycle of operation of the DC/DC chopper.

Two capacitors, C1 and C2, are equal in value. Starting with the initial conditions of switch S1 being turned on, conducting load current, capacitor C2 charged to E volts and capacitor C1 at zero volts, switch S1 is turned off. The load current will very quickly transfer to the filter circuit. Half of the load current will go through diode D1 and capacitor C1. The other half of the current will through capacitor C2 and diode D3. Note that with the current quickly transferring to the lossless filter the V/I turn-off losses are small.

As the current flows into the filter, the voltage across switch S1 will increase till it gets to E volts, at which time the diode D4 will clamp the load current and the turn off cycle is over. At the end of the turn-off cycle, capacitor C1 will be charged to E volts and capacitor C2 will be discharged to zero volts. The voltages on two capacitors will stay the same until switch S1 is turned back on.

When switch S1 is turned on two things happen. The first is the diode D4 will block and the load current will then flow in switch S1. The second thing that will happen is that the energy that is stored in capacitor C1 will be transferred to capacitor C2.

The energy is transferred in the following way. When switch S1 is turned on a resonant current will flow through capacitor C1, inductor L1, diode D2, capacitor C2, switch S1 and back to capacitor C1. At the end of the resonant period capacitor C2 will be charged to E volts and capacitor C1 will be discharged to zero volts. Any time after the resonant period is over, switch S1 can be turned off again.

Note that there is a minimum that switch S1 has to be turned on, the resonant time, in order that the lossless filter will continue to operate correctly. In this version, the filter energy is returned to the DC source. In other versions, the filter energy is transferred to the load.

Alternative Embodiments

In general, switching devices are designed to minimize the combination of conduction losses and switching losses when used in hard switching circuits. With losses switching, the switching device designers can redesign their devices to minimize conduction losses by minimizing DC forward drop without regard to the effect on switching losses. By using devices with high minority carrier lifetime, the forward conduction drop can be significantly reduced from existing levels. The high minority carrier lifetime, which involves high switching losses in conventional circuits, has minimal effect with reduced switching losses, since VI turn-on losses, VI turn-off losses, and tail current losses are no longer a primary concern.

With the DC forward drop being minimized or reduced, the existing devices will be able to handle considerably more current. This will give a device manufacturer a significant sales advantage if they have an advanced position with the new concept especially since the new devices can be also run at considerably higher frequencies (e.g., 10 to 100 times).

The design optimization process may vary dependent upon the voltage rating and the basic device design. According to certain embodiments, the possible voltage ranges where the optimization will differ may be 0-600, 600+ thru 1800V, 2500V-4500V, and 6000V, and/or higher. Devices with voltage ratings of 6000V and more may become particularly practical, as they can reduce the number of levels of circuitry required to implement inverter functions. Devices that could possibly eliminate or reduce tail period but have other trade-off effects with hard switching circuits may now become practical and even significantly beneficial, as the design trade-offs required to manage switching losses are no longer of concern.

It will also be important with new switching devices made of materials other than silicon. It could make materials that have been rejected in the past because of switching losses, become a relatively strong candidate for a new switching device material. Further, the optimization process could vary dependent upon what topology the switching device will be used in.

General Matters

Embodiments of the invention provide methods and apparatuses for concurrently eliminating or substantially reducing multiple switching losses in an inverter switching circuit.

In one embodiment of the invention, the VI turn-off loss and the tail current loss are substantially reduced by holding the voltage across the switching device low during the V/I turn-off loss time and the tail current loss time of the switching device. For alternative embodiments of the invention, additional losses are substantially reduced. It will be apparent to those skilled in the art that embodiments of the invention may be employed to reduce various combinations of the identified losses.

Embodiments of the invention involve circuitry added to the inverter circuit. For various alternative embodiments of the invention the additional circuitry is relatively inexpensive compared to the cost of the switching device. Moreover, embodiments of the invention allow for the substantial reduction in the cost of an inverter for the same application. For example, embodiments of the invention allow higher frequency switching which drives down the cost of the filter. Also, the substantially reduced switching losses allow the inverter to be used at a significantly higher power.

The switches and the filter comprise a substantial portion of the cost of an inverter. Therefore, embodiments of the invention, which double the power a switch can handle and also substantially reduce the cost of the filter (by allowing for increased operating frequencies), provide a substantial economic benefit.

For example, for many types of bi-polar devices, the switching devices losses (caused by turning-on and turning-off the switching device) equal the conduction losses at 3 KHz. Therefore, eliminating such losses can significantly reduce the costs of an inverter with an operational frequency of approximately 3 KHz as the size of the semiconductor and heat sinks would be reduced. Alternatively, the inverter could be run at much higher frequencies (i.e. 30 to 300 KHz) with reduced costs for the other circuitry in the inverter. Further, substantially reduced switching losses allow devices to be designed having a lower conduction drop since the switching losses have been minimized as a design consideration. Thus, costs can be further reduced.

Embodiments of the invention may be applied to circuits operating in HSM or SSM with both voltage source inverters and current source inverters, and with both MOS devices and bipolar devices. Many embodiments of the invention have been discussed, and other embodiments within the scope of the invention will be apparent to those skilled in the art. The appropriate embodiment of the invention to achieve a reduced-loss switch will depend on application requirements, power levels, input voltage level and output voltage range, need for regeneration, and other system parameters.

Moreover the various techniques and circuitry described in accordance with alternative embodiments of the invention may be used independently, to effect the reduction of the identified corresponding losses. Such techniques and circuitry may also be used in conjunction one with another to effect the reduction of specific losses.

Thus, power losses reduction in switching power converters has been described. In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A modified Nevelle Mapham power switching circuit, comprising:
   at least one switching device;
   a voltage source electrically coupled to the switching device, the voltage source providing a normal operational voltage for the power switching circuit; and
   a switching voltage reduction mechanism for substantially reducing a voltage across the switching device, relative to the normal operational voltage, prior to and during at least a portion of a turn-on time of the at least one switching device, wherein the switching voltage reduction mechanism includes a saturable reactor and a resistor coupled between the voltage source and the switching device, the saturable reactor effecting the substantially reduced voltage across the switching device during at least a portion of the turn-on time of the switching device.

2. The circuit of claim 1, wherein the saturable reactor and the resistor are coupled in parallel, and wherein the parallel coupled saturable reactor and the resistor are coupled in series with the switching device.

3. The circuit of claim 2, further comprising an inductor coupled in series between the voltage source and the parallel coupled saturable reactor and the resistor.

4. The circuit of claim 2, wherein the resistor comprises a first resistor and a second resistor coupled in parallel, each of the first resistor and the second resistor being coupled in series with a first diode and a second diode respectively.

5. The circuit of claim 4, wherein polarities of the first and second diodes are opposite.

6. The circuit of claim 1, wherein the saturable reactor is configured to have a saturation time sufficient enough to hold off the voltage source to the switching device, until a voltage across the switching device falls below a predetermined level after being turned on.

7. The circuit of claim 6, wherein when the switching device is turned on, the saturation time of the saturable reactor is sufficient to allow the voltage across the switching device to fall below the predetermined level before a current through the switching device begins to rise.

8. The circuit of claim 7, wherein when the switching device is turned on, the voltage across the switching device falls while a minimum amount of current is allowed to flow across the switching device due to the saturable reactor.

9. The circuit of claim 6, wherein the resistor is configured to limit a current flow through the switching device during a conductivity modulation loss time of the switching device.

10. The circuit of claim 9, wherein the resistor is configured to allow a current that is substantially lower than a full switching current of the switching device, but is sufficient to effect a conductivity modulation of the switching device.

11. The circuit of claim 1, wherein the switching device is selected from the group consisting of a bi-polar transistor, an insulated gate bi-polar transistor, a gate turn-off thyristor, a silicon-controlled rectifier device, and an integrated gate commutated thyristor.

* * * * *